(12) United States Patent
Arakawa et al.

(10) Patent No.: US 6,883,073 B2
(45) Date of Patent: Apr. 19, 2005

(54) VIRTUALIZED VOLUME SNAPSHOT FORMATION METHOD

(75) Inventors: Hiroshi Arakawa, Sagamihara (JP); Takashi Oeda, Sagamihara (JP); Katsunori Nakamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 100 days.

(21) Appl. No.: 10/120,404

(22) Filed: Apr. 12, 2002

(65) Prior Publication Data

US 2003/0131207 A1 Jul. 10, 2003

(30) Foreign Application Priority Data

Jan. 9, 2002 (JP) ........................................ 2002-002529

(51) Int. Cl.[7] ............................................. G06F 12/16
(52) U.S. Cl. ...................................... 711/162; 711/114
(58) Field of Search .............................. 711/162, 114, 711/203; 707/204; 714/6

(56) References Cited

U.S. PATENT DOCUMENTS 5,210,866 A * 5/1993 Milligan et al. ............... 714/6
6,038,639 A * 3/2000 O'Brien et al. ............. 711/114
6,681,303 B1 1/2004 Watanabe et al.

OTHER PUBLICATIONS

"Virtualizing The San" Jul. 5, 2000.

JP-A-2000-132343, no date, or country code.

* cited by examiner

Primary Examiner—Hiep T. Nguyen
(74) Attorney, Agent, or Firm—Antonelli, Terry, Stout & Kraus, LLP

(57) ABSTRACT

A server has management information including correspondence information between a physical storage region and a virtualized storage region, so as to provide a virtualized storage region. The server includes a unit for using the management information to provide a virtualized storage region to another host and a unit for instructing the control of the storage regions based on the virtualized storage region to a controller for a storage device for providing the physical storage region. Moreover, the controller includes a unit having whole or a part of management information including the correspondence information and performing the control of the storage device based on the virtualized storage region in response to the instruction.

15 Claims, 26 Drawing Sheets

FIG. 4

101 VIRTUALIZED VOLUME INFORMATION

| VIRTUALIZED VOLUME No. | SAN ADDRESS |
|---|---|
| 0 | WWN=50:00:60:e8:02:f0:67:02<br>LUN=00 |
| 1 | WWN=50:00:60:e8:02:f0:67:03<br>LUN=02 |
| 2 | WWN=50:00:60:e8:02:f0:67:01<br>LUN=01 |
|  |  |

FIG. 5

102 PHYSICAL VOLUME INFORMATION

| DEVICE No. | PHYSICAL VOLUME No. | SAN ADDRESS | VENDOR NAME | TYPE NAME | PRODUCTION No. | VERSION No. | STATE |
|---|---|---|---|---|---|---|---|
| 0 | 2 | WWN=50:00:60:e8: 02:f0:67:12 LUN=00 | HITACHI | 9900 | 4422 | 0111 | IN USE |
| 0 | 3 | WWN=50:00:60:e8: 02:f0:67:13 LUN=01 | HITACHI | 9900 | 4422 | 0111 | IN USE |
| 0 | 4 | WWN=50:00:60:e8: 02:f0:67:14 LUN=02 | HITACHI | 9900 | 4422 | 0111 | IN USE |
| 0 | 12 | WWN=50:00:60:e8: 02:f0:67:22 LUN=00 | HITACHI | 9900 | 4422 | 0111 | IN USE |
| 0 | 13 | WWN=50:00:60:e8: 02:f0:67:23 LUN=01 | HITACHI | 9900 | 4422 | 0111 | IN USE |
| 0 | 14 | WWN=50:00:60:e8: 02:f0:67:24 LUN=02 | HITACHI | 9900 | 4422 | 0111 | IN USE |
| 0 | 22 | WWN=50:00:60:e8: 02:f0:67:32 LUN=00 | HITACHI | 9900 | 4422 | 0111 | ACCESS PROHIBITED |
| 1 | 3 | WWN=00:11:22:33: 44:55:66:77:88 LUN=00 | VENDER_A | TYPE_A | 1000 | 0100 | IN USE |

FIG. 6

103 MAPPING INFORMATION

| VIRTUALIZED VOLUME No. | VIRTUALIZED VOLUME SIZE | PHYSICAL VOLUME COUNT | CONCATENATION ORDER | DEVICE No. | PHYSICAL VOLUME No. | PHYSICAL VOLUME RANGE | SNAPSHOT ATTRIBUTE |
|---|---|---|---|---|---|---|---|
| 0 | 2000 | 2 | 1 | 0 | 2 | 0-999 | PAIR No. = 0, SOURCE |
|   |   |   | 2 | 1 | 3 | 0-999 |   |
| 1 | 3000 | 4 | 1 | 0 | 2 | 1000-1499 | PAIR No. = 1, SOURCE |
|   |   |   | 2 | 1 | 5 | 0-999 |   |
|   |   |   | 3 | 3 | 1 | 2000-2999 |   |
|   |   |   | 4 | 4 | 1 | 500-999 |   |
| 2 | 2000 | 3 | 1 | 1 | 3 | 1000-1499 | PAIR No. = 2, SOURCE |
|   |   |   | 2 | 0 | 3 | 0-499 |   |
|   |   |   | 3 | 0 | 4 | 3000-3999 |   |
| 10 | 1000 | 2 | 1 | 3 | 0 | 1500-1999 | NO PAIR PRESENT |
|   |   |   | 2 | 4 | 0 | 0-499 |   |
| 100 | 2000 | 2 | 1 | 0 | 12 | 0-999 | PAIR No. = 0, DESTINATION |
|   |   |   | 2 | 1 | 13 | 0-999 |   |
| 101 | 3000 | 4 | 1 | 0 | 22 | 1000-1499 | PAIR No. = 1, DESTINATION |
|   |   |   | 2 | 1 | 15 | 0-999 |   |
|   |   |   | 3 | 3 | 11 | 2000-2999 |   |
|   |   |   | 4 | 4 | 11 | 500-999 |   |
| 102 | 2000 | 3 | 1 | 1 | 13 | 1000-1499 | PAIR No. = 2, DESTINATION |
|   |   |   | 2 | 0 | 13 | 0-499 |   |
|   |   |   | 3 | 0 | 14 | 3000-3999 |   |

FIG. 7

104 SNAPSHOT INFORMATION

| PAIR No. | GROUP No. | SOURCE VOLUME | DESTINATION VOLUME | STATE |
|---|---|---|---|---|
| 0 | 0 | 0 | 100 | DIVISION COMPLETE |
| 1 | 1 | 1 | 101 | FORMATION COMPLETE |
| 2 | 0 | 2 | 102 | DIVISION COMPLETE |

FIG. 8

311 IN-DEVICE PHYSICAL VOLUME INFORMATION

| (DEVICE No. 0) PHYSICAL VOLUME No. | SAN ADDRESS | STATE |
|---|---|---|
| 0 | WWN=50:00:60:e8:02:f0:67:10 LUN=00 | IN USE |
| 1 | WWN=50:00:60:e8:02:f0:67:11 LUN=02 | IN USE |
| 2 | WWN=50:00:60:e8:02:f0:67:12 LUN=00 | IN USE |
| 3 | WWN=50:00:60:e8:02:f0:67:13 LUN=01 | IN USE |
| 4 | WWN=50:00:60:e8:02:f0:67:14 LUN=02 | IN USE |
| 12 | WWN=50:00:60:e8:02:f0:67:22 LUN=00 | IN USE |
| 13 | WWN=50:00:60:e8:02:f0:67:23 LUN=01 | IN USE |
| 14 | WWN=50:00:60:e8:02:f0:67:24 LUN=02 | IN USE |
| 22 | WWN=50:00:60:e8:02:f0:67:32 LUN=00 | ACCESS PROHIBITED |

FIG. 9

312 IN-DEVICE MAPPING INFORMATION

| VIRTUALIZED VOLUME No. | (DEVICE NO. 0), PHYSICAL VOLUME COUNT | CONCATENATION ORDER | (DEVICE NO. 0), PHYSICAL VOLUME No. | PHYSICAL VOLUME RANGE | SNAPSHOT ATTRIBUTE |
|---|---|---|---|---|---|
| 0 | 1 | 1 | 2 | 0-999 | PAIR No. = 0, SOURCE |
| 1 | 1 | 1 | 2 | 1000-1499 | PAIR No. = 1, SOURCE |
| 2 | 2 | 2 | 3 | 0-499 | PAIR No. = 2, SOURCE |
|   |   | 3 | 4 | 3000-3999 |   |
| 100 | 1 | 1 | 12 | 0-999 | PAIR No. = 0, DESTINATION |
| 101 | 1 | 1 | 22 | 1000-1499 | PAIR No. = 1, DESTINATION |
| 102 | 2 | 2 | 13 | 0-499 | PAIR No. = 2, DESTINATION |
|   |   | 3 | 14 | 3000-3999 |   |

FIG. 11

313 IN-DEVICE SNAPSHOT INFORMATION

| PAIR No. | GROUP No. | SOURCE VOLUME | DESTINATION VOLUME | (DEVICE No. 0) PHYSICAL VOLUME PAIR COUNT | (DEVICE No. 0) SOURCE PHYSICAL VOLUME No. | (DEVICE No. 0) DESTINATION PHYSICAL VOLUME No. | STATE |
|---|---|---|---|---|---|---|---|
| 0 | 0 | 0 | 100 | 1 | 2 | 12 | DIVISION COMPLETE |
| 1 | 1 | 1 | 101 | 1 | 2 | 22 | FORMATION COMPLETE |
| 2 | 0 | 2 | 102 | 2 | 3 | 13 | DIVISION COMPLETE |
|   |   |   |   |   | 4 | 14 |   |

FIG. 25

311 IN-DEVICE PHYSICAL VOLUME INFORMATION

| PHYSICAL VOLUME No. | SAN ADDRESS | PHYSICAL VOLUME RANGE | STATE |
|---|---|---|---|
| 0 | WWN=50:00:60:e8:02:f0:67:10 LUN=00 | 0-9999 | UNUSED |
| 1 | WWN=50:00:60:e8:02:f0:67:11 LUN=02 | 0-9999 | UNUSED |
| 2 | WWN=50:00:60:e8:02:f0:67:12 LUN=00 | 0-999 | IN USE |
|   |   | 1000-1499 | IN USE |
|   |   | 1500-9999 | UNUSED |
| 3 | WWN=50:00:60:e8:02:f0:67:13 LUN=01 | 0-499 | IN USE |
|   |   | 500-9999 | UNUSED |
| 4 | WWN=50:00:60:e8:02:f0:67:14 LUN=02 | 0-2999 | UNUSED |
|   |   | 3000-3999 | IN USE |
|   |   | 4000-9999 | UNUSED |
| 12 | WWN=50:00:60:e8:02:f0:67:22 LUN=00 | 0-999 | IN USE |
|   |   | 1000-1999 | ACCESS PROHIBITED |
|   |   | 2000-2499 | IN USE |
|   |   | 2500-3499 | IN USE |
|   |   | 3500-9999 | UNUSED |

FIG. 26

313 IN-DEVICE SNAPSHOT INFORMATION

| PAIR No. | GROUP No. | SOURCE VOLUME | DESTINATION VOLUME | (DEVICE No. 0) PHYSICAL VOLUME PAIR COUNT | (DEVICE No. 0) SOURCE PHYSICAL VOLUME No. | SOURCE PHYSICAL VOLUME RANGE | (DEVICE No. 0) DESTINATION PHYSICAL VOLUME No. | DESTINATION PHYSICAL VOLUME RANGE | STATE |
|---|---|---|---|---|---|---|---|---|---|
| 0 | 0 | 0 | 100 | 1 | 2 | 0-999 | 12 | 0-999 | DIVISION COMPLETE |
| 1 | 1 | 1 | 101 | 1 | 2 | 1000-1999 | 12 | 1000-1999 | FORMATION COMPLETE |
| 2 | 0 | 2 | 102 | 2 | 3 | 0-499 | 12 | 2000-2499 | DIVISION COMPLETE |
| | | | | | 4 | 3000-3999 | 12 | 2500-3499 | |

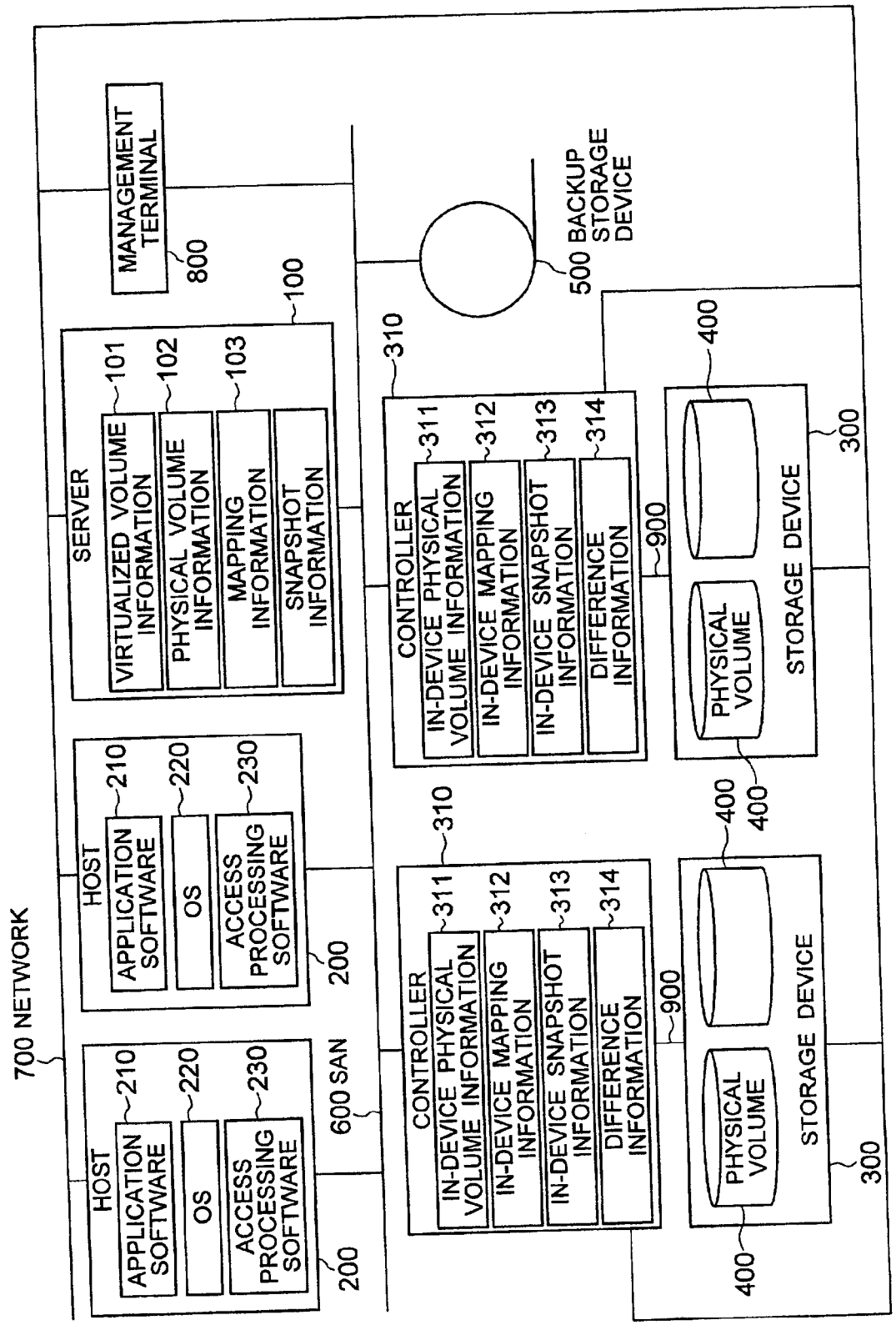

VIRTUALIZED VOLUME SNAPSHOT FORMATION METHOD

BACKGROUND OF THE INVENTION

1. Field of the Invention

The present invention relates to a computer system control method, a computer system, and storage device control method and in particular, to a method for controlling information processing system which creates a virtualized volume snapshot, a computer system and storage device control method and a storage device.

2. Description of the Related Art

In information processing system installed in banks and stock companies, online processing and batch processing may be terminated abnormally by a program bug or storage device failure and any contradictions may occur in data. Moreover, data may be erased by a careless mistake of an operator of an information processing system. To eliminate the data contradiction and resume the processing which has stopped in the middle or to restart the processing which has stopped in the middle, it is often a case that backup operation is performed as a routine work.

As a conventional technique of this type, for example, a technique disclosed in JP-A-2000-132343 is known. This conventional technique is related to a storage device system in which to obtain backup for a copy of data without preventing access to the data to be backed up, a frozen image copy (snapshot) with data consistency can be created. In this conventional technique, a snapshot is created not in a host computer but in a storage device system, so as to reduce the load of the host computer accompanied by a snapshot formation such as data copying. In this conventional technique, the storage device system creates a snapshot as follows. Data copying is performed between a copy source (source) volume and a copy destination (destination) volume specified by a host computer and a copy stop for freezing data (division of a volume pair) and data resynchronization are controlled on volume unit basis. Furthermore, in this conventional technique, in order to reduce data copy quantity so as to reduce the time required for copy and the processing load, the data copy, division, resynchronization and the like are performed only for a necessary region within the volume.

Use of the aforementioned snapshot is effective not only for the backup but also for the data transfer and the data sharing with data consistency between the databases.

Moreover, recently, in the information processing systems, an enormous data quantity is used and there arises a problem that cost for managing a storage device and a storage region has become very high. Concerning this, a research company Moregan Keegan has reported "Virtualizing the SAN" (Jul. 5, 2000). According to this report, a physical volume provided by a storage device is flexibly virtualized according to a request from a host computer, and this virtualized volume is supplied to the host computer, thereby enabling reduction of the management cost. Furthermore, the report shows an example of several system configurations and methods for virtualization.

One of them is as follows. A server for virtualization is connected between a host computer and a storage device system and the server address-converts one or more physical volume regions for the host computer, thereby creating a virtualized volume, so as to manage correspondence between a physical volume region and a virtualized volume region. An access to the virtualized volume by the host computer is converted into an access to the physical volume, thereby processing an access request by the host computer. Moreover, in another example, a host computer is connected to a storage device system and further server is connected to the host computer for managing correspondence between a physical volume region and a virtualized volume region. When the host computer accesses the virtualized volume, the request for accessing the virtualized volume by the host computer is received by access processing software on the host computer and the software asks the server about a position of data to be accessed on the physical volume. The server replies the position to the software and the software accesses the physical volume provided by the storage device system by using the position, thereby processing the access request of the host computer.

Each of the aforementioned two examples has means for maintaining information of correspondence between a physical volume region and a virtualized volume region and managing correspondence between the physical volume region and the virtual volume region.

Moreover, the correspondence between the physical volume and the virtualized volume may be one of the following three cases: a region constituting one virtualized volume is contained in only one physical volume; a region constituting one virtualized volume is contained in a plurality of physical volumes; and regions constituting a plurality of virtualized volumes are contained in only one physical volume. Moreover, a plurality of physical volumes may belong to different storage device systems.

In the aforementioned conventional technique in which a storage device system creates a snapshot, management of a source volume and a destination volume and control of data copy, division, resyncrhonization have been performed according to a physical volume provided by the storage device system. For this, when a storage region is virtualized as has been described above, the aforementioned conventional technique has a problem that when creating and using a snapshot according to a virtualized volume used by a host computer, a limit is caused in control of the snapshot. For example, when regions constituting a plurality of virtualized volumes are at least partially contained in one physical volume, in order to create a snapshot of the aforementioned virtualized volume, it becomes necessary to create a snapshot about the aforementioned physical volume. As a result, a destination volume of the physical volume contains both of the virtualized volumes and operation of the snapshot of one of the virtualized volumes may affect the other and it is impossible to perform control such as division and resynchronization for snapshot of each of the virtualized volumes independently from each other.

Moreover, when a region constituting one virtualized volume is contained in a plurality of physical volumes, formation of snapshot of the virtualized volume requires formation of snapshot of the plurality of physical volumes. However, since the snapshot formation instruction and control instruction to the storage device system are performed on physical volume basis, snapshot formation for one virtualized volume requires instruction including timing synchronization about the respective physical volumes a plurality of times. This complicates the snapshot management and control, increasing the processing overhead.

SUMMARY OF THE INVENTION

It is therefore an object of the present invention to provide a computer system control method, computer system, and a storage device enabling management and control of processing in a storage device system according to a virtualized storage region in an information processing system performing virtualization of a storage region and in particular, computer system control method, a computer system, and a storage device capable of snapshot formation, management, and control according to a virtualized storage region independently.

Moreover, another object of the present invention is to provide a computer system control method, computer system, and a storage device capable of specifying processing, management, and control in a storage device system according to a virtualized storage region in an information processing system performing virtualization of a storage region.

According to the present invention, the above object is achieved by a control method for a computer system having at least one storage devices; at least one control device providing at least one storage region of the storage device; and a computer for managing information for providing a virtualized storage region of the storage region; the method including the steps of adding correspondence information between the storage region provided by the storage device and the virtualized storage region, to information for providing the storage region of the computer; holding the correspondence information of the computer entirely or partially in the control device to control the storage device.

Furthermore, the above object is achieved by the computer system wherein information in the computer for providing the storage region includes correspondence information between the storage region provided by the storage device and the virtualized storage region, and the control device includes a unit for holding the correspondence information of the computer entirely or partially and controlling the one or more storage devices.

Furthermore, the above object is achieved by a storage device control method in the computer system having the steps of adding correspondence information between the storage region provided by the storage device and the virtualized storage region, to information for providing the storage region of the computer; and holding the correspondence information of the computer entirely or partially in the control device to control the storage device.

Furthermore, the above object is achieved by a storage device in the computer system wherein the storage device includes a unit for controlling a replica formation of a storage region by an instruction for controlling the replica formation to be performed according to the virtualized storage region, from the control device holding entire or a part of correspondence information between the storage region provided by the storage device and the virtualized storage region.

Other objects, features and advantages of the invention will become apparent from the following description of the embodiments of the invention taken in conjunction with the accompanying drawings.

BRIEF DESCRIPTION OF THE DRAWINGS

FIG. 4 is a table explaining an example of virtualized volume information held by a server.

FIG. 5 is a table explaining an example of physical volume information held by a server.

FIG. 6 is a table explaining an example of mapping information held by a server.

FIG. 7 is a table explaining an example of snapshot information held by a server.

FIG. 8 is a table explaining an example of in-device physical volume information held by a controller of a storage device.

FIG. 9 is a table explaining an example of in-device mapping information held by the controller.

FIG. 11 is a table explaining an example of the in-device snapshot held by the controller.

FIG. 25 shows another example of physical volume information in the device.

FIG. 26 shows another example of snapshot information in the device.

FIG. 27 is a block diagram showing the constitution of the computer system according to another embodiment of the present invention.

DETAILED DESCRIPTION OF THE EMBODIMENTS

Description will now be directed to a computer system control method, a computer system, and a storage device according to embodiments of the present invention with reference to the attached drawings.

Figure 1:
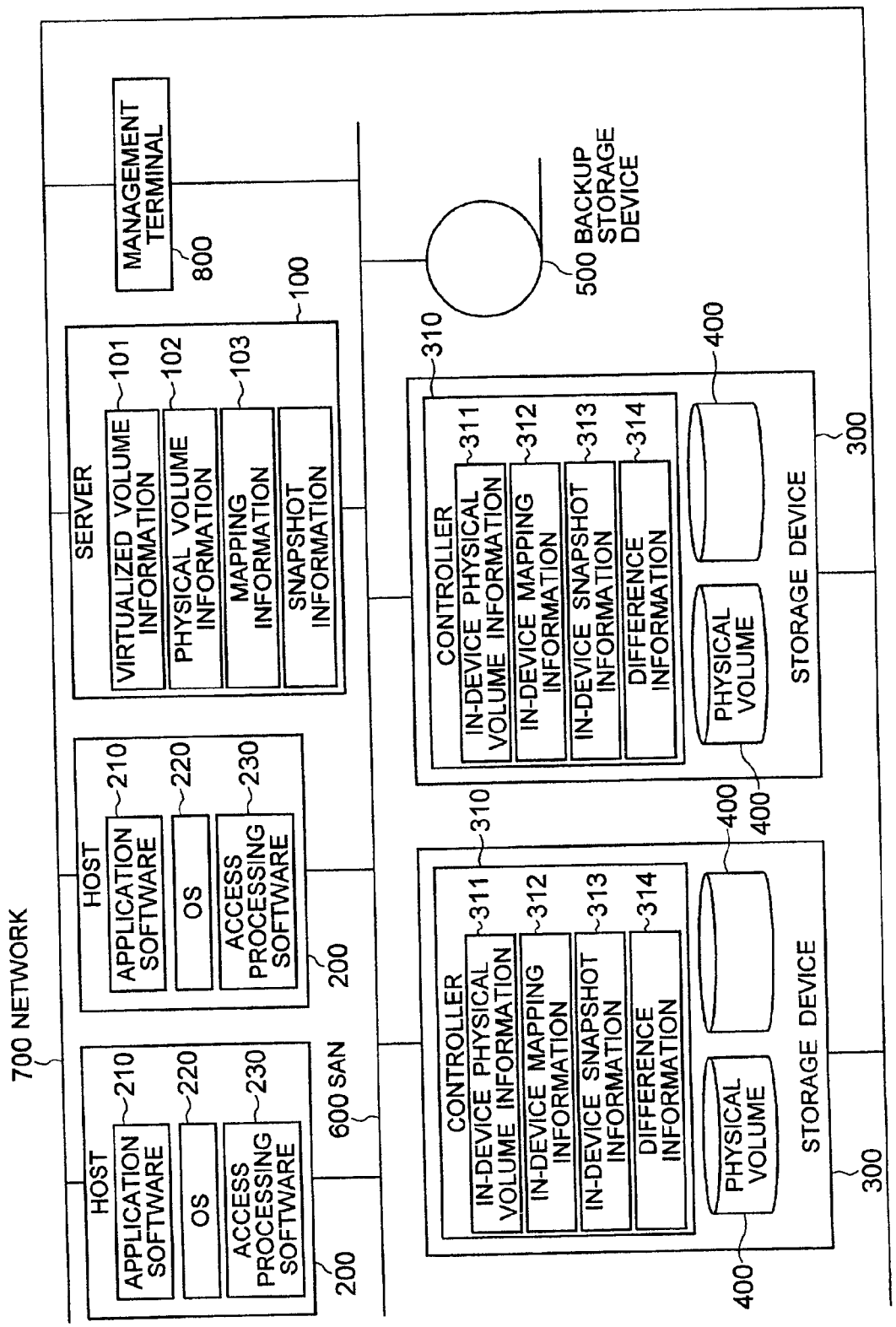
FIG. 1 is a block diagram showing configuration of a computer system according to an embodiment of the present invention.

FIG. 1 is a block diagram showing configuration of a computer system according to an embodiment of the present invention. In FIG. 1, there are shown a server 100, virtualized volume information 101, physical volume information 102, mapping information 103, snapshot information 104, a host 200, application software 210, OS 220, access processing software 230, a storage device 300, a controller 310, in-device physical volume information 310, in-device mapping information 312, in-device snapshot information 313, difference information 314, a physical volume 400, a backup storage device 500, a storage area network (SAN) 600, a network 700, and a management terminal 800.

The computer system according to the embodiment of the present invention includes: the server 100, the host 200, the storage device 300, the backup storage device 500, and the management terminal 800. The server 100, the host 200, the storage device 300, the backup storage device 500, and the management terminal 800 are connected one to another via a network 700. As a protocol and standard used in the network 700, there can be exemplified IP. Moreover, the server 100, the host 200, the storage device 300, the backup storage device 500, and the management terminal 800 are also connected one to another via storage area network (SAN) 600 serving as a path for data transfer. As a protocol and standard used in the SAN, there can be exemplified a fibre channel (FC), IP, Infini Band, and the like.

The host 200 contains application software 210, OS 220, and access processing software 230. The application software 210, for example, may be a backup software. Here, the application software 210 also contains a middle-ware such as database management software (DBMS). The access processing software 230 may be a file system, a device driver, and the like.

The storage device 300 has a function for recording/reproducing data used by the host 200 according to a request from the server 100 or the host 200. The storage device 300 may be a single magnetic disc, a composite magnetic disc device (JBOD, Just Bunch OF Disks), a magnetic disc of RAID (Redundant Arrays of Inexpensive Disks) configuration having a controller. The storage device 300 has the controller 310 for performing processing which will be detailed later. The storage device 300 provides the physical volume 400 as a data storage region to the server 100 or to the host 200.

The backup storage device 500 is a storage device for storing backup of the data stored in the storage device 300 and may be a tape device, a tape library device, a magnetic disc device, a magneto-optical disc device, and the like.

Each of the server 100, the host 200, the controller 310, and the management terminal 800 has components indispensable to a computer such as a memory and a CPU for executing processing but they are not depicted because they are not important in the embodiment of the present invention.

Processing according to the embodiment of the present invention which will be explained below is performed as follows. In an environment that the physical volume 400 provided by the storage device 300 is virtualized by the server 100 and supplied to the host 200, according to an instruction from the server 100, the storage device 300 forms a snapshot of the physical volume corresponding to the volume virtualized by the storage device 300 and controls the division and the resynchronization.

Figure 2:
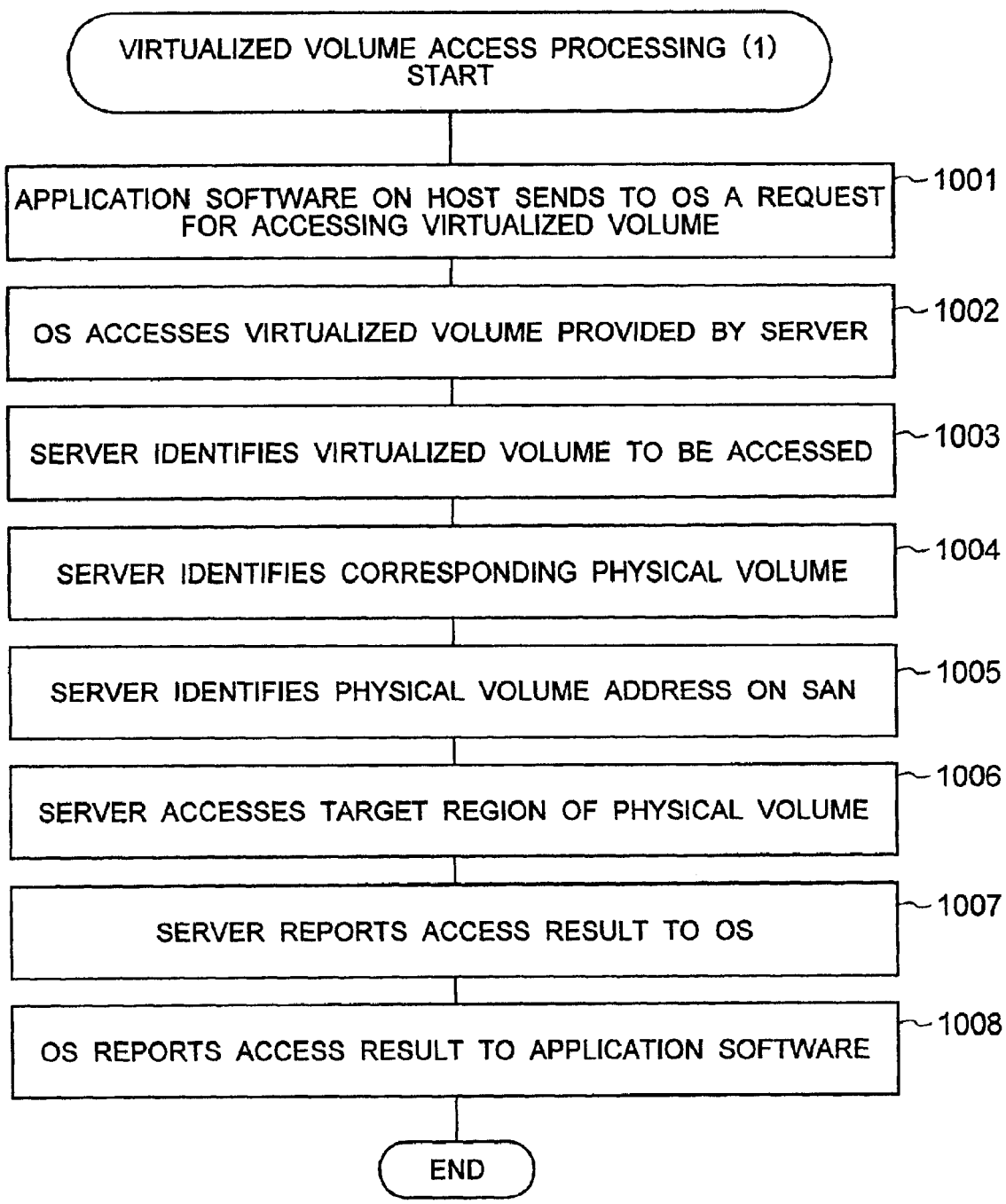
FIG. 2 is a flow chart explaining a first example of processing when a host accesses (read/write) a virtualized volume.
Figure 3:
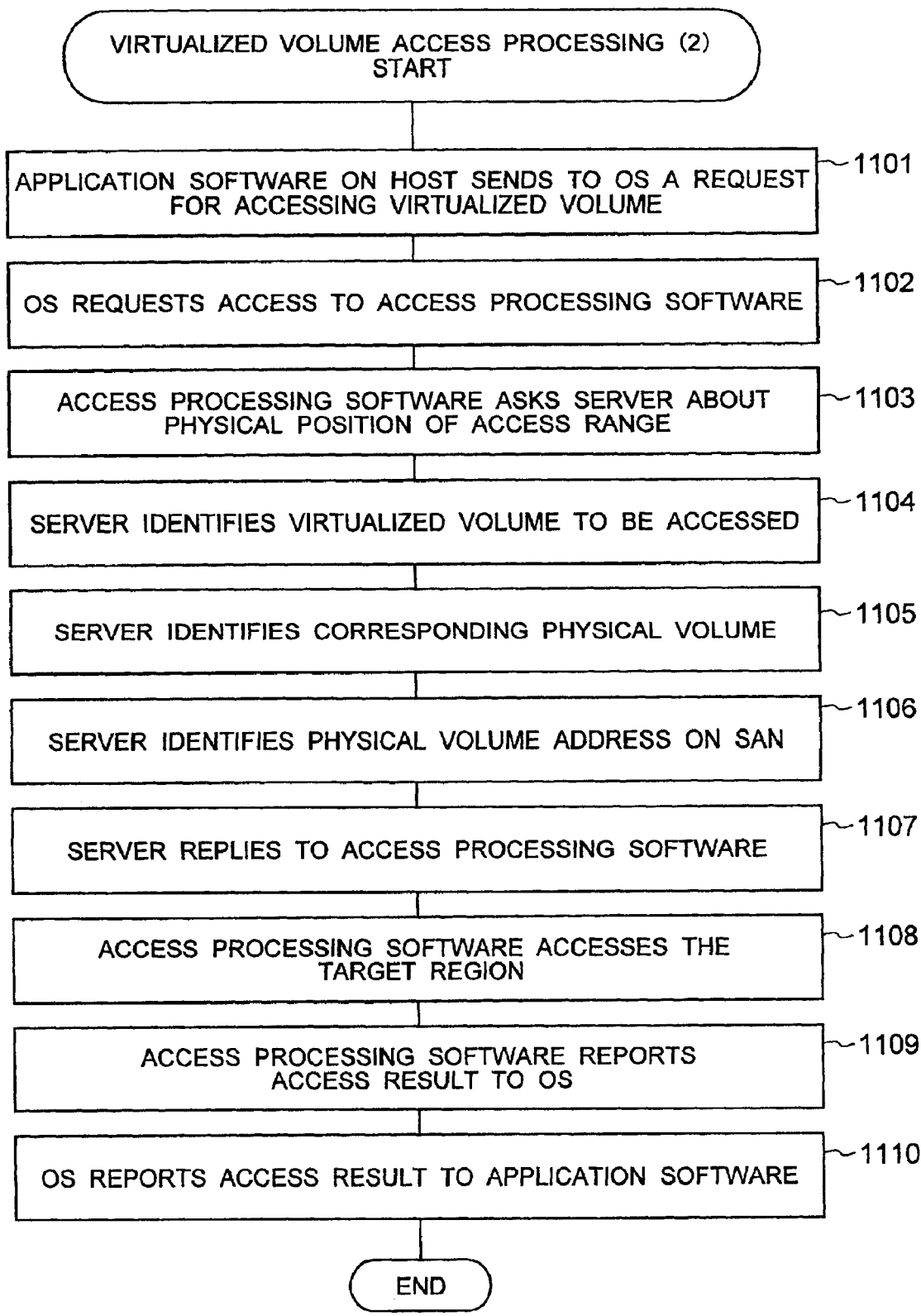
FIG. 3 is a flow chart explaining a second example of processing when a host accesses (read/write) a virtualized volume.

FIG. 2 and FIG. 3 show a flow chart for explaining a processing operation when the host 200 accesses (read/write) the virtualized volume. Hereinafter, explanation will be given on this. Firstly, a first example will be explained with reference to FIG. 2.

(1) The application software 210 on the host 200 specifies a virtualized volume and access range of the virtualized volume and transmits an access request to the OS 220 (step 1001).

(2) The OS 220 which has received the access request accesses a virtualized volume provided by the server 100 via the SAN 600 (step 1002).

(3) The server 100 accessed, uses an access parameter and virtualized volume information 101 (which will be detailed later) to identify a virtualized volume to be accessed and by using mapping information 103 (which will be detailed later) specifies a region of the physical volume 400 corresponding to the access range (steps 1003 and 1004).

(4) Moreover, the server 100 uses physical volume information 102 (which will be detailed later) to identify an address of the physical volume 400 on the SAN 600 and accesses a target region of the physical volume 400 via the SAN 600 and reports an access result to the OS 220 of the host 200 (steps 1005 to 1007).

(5) The OS 220 reports the access result to the application software 210 which has requested the access and terminates the processing (step 1008).

In the aforementioned processes, upon access, read data or write data is transferred between the host 200 and the server 100, and between the server 100 and the storage device 300 via the SAN 600.

Next, referring to the flow chart of FIG. 3, explanation will be given on a second example of processing operation performed when the host 200 accesses (read/write) the virtualized volume.

(1) The application software 210 on the host 200 specifies a virtualized volume and an access range of the virtualized volume and transmits an access request to the OS 220 (step 1101).

(2) The OS 220 which has received the access request requests an access to the access processing software 230 (step 1102).

(3) Upon reception of the access request in step 1102, the access processing software 230 asks the server 100 about a physical position of the access range via the network 700 or the SAN 600 (step 1103).

(4) The server 100 which has received the query identifies a virtualized volume by using an access parameter and virtualized volume information 101 (which will be detailed later) and identifies a region of the physical volume corresponding to the access range by using mapping information 103 (which will be detailed later) (steps 1104 and 1105).

(5) Moreover, by using physical volume information 102 (which will be detailed later), the server 101 identifies an address of the physical volume 400 on the SAN 600 and replies to the access processing software 230 (steps 1106 and 1107).

(6) By using the replied physical volume address and region, the access processing software 230 accesses the target region of the physical volume 400 via the SAN 600 and reports an access result to the OS 220 (steps 1108 and 1109).

(7) The OS 220 reports an access result to the application software 210 which has requested access and terminates the processing (step 1110).

In the aforementioned processing, read data or write data is transferred between the host 200 and the storage device 300 via the SAN 600.

By the aforementioned processing, the server 100 can virtualize the physical volume 400 provided by the storage device 300 and provide the virtualized volume to the host 200 and the host 200 can store data in the virtualized volume and access the virtualized volume.

In the aforementioned processing examples, the application software 210 specifies a virtualized volume and an access range of the virtualized volume. However, it is also possible that the application software 210 specifies a file name to be accessed, and the OS 220 or the access processing software 230 determines a range on the virtualized volume from the file name and accesses it.

FIG. 4 explains an example of the virtualized volume information 101 held by the server 100. Next, explanation will be given on this virtualized volume information 101. The virtualized volume 101 is composed of a virtualized volume number which identifies a virtualized volume currently provided by the server 100; and a SAN address indicating an address of the virtualized volume on the SAN 600. The SAN address may be, for example, information identifying the volume on FC, IP, iSCSI protocol such as WWN, LUN, IP address, MAC address.

FIG. 5 is a table explaining an example of the physical volume information 102 held by the server 100. Next, explanation will be given on the physical volume information 102. The physical volume information 102 is composed of a device number, a physical volume number, a SAN address, a vendor name, a type name, a production number, a version number, and a state.

In the aforementioned, the device number is a number indicating a storage device 300 which can be used by the server 100. The physical number indicates the physical volume 400 which is provided by the storage device 300 and can be used by the server 100. The SAN address indicates an address of the physical volume 400 in the SAN 600. The vendor name indicates a vendor name of the storage device 300. The type name indicates a type of the storage device 300. The production number indicates a production number of the storage device 300. The version number indicates a version in the type of the storage device. The state indicates a state of the physical volume 400.

As a method for the server 100 to fetch the aforementioned information from the storage device 300 may be issuing an SCSI INQUIRY command and a MODE SENSE command. In this embodiment, the storage device 300 may be only one or a plurality storage devices 300 may exist and in the latter case, the storage devices 300 may be of different vendor types and different versions.

FIG. 6 is a table showing an example of the mapping information 103 held by the server. Next, explanation will be given on this mapping information 103. The mapping information 103 is composed of a virtualized volume number, virtualized volume size, a number of physical volumes (physical volume count), a concatenation order, a device number, a physical volume number, a physical volume range, and snapshot attribute.

In the aforementioned, the virtualized volume number is a number indicating a virtualized volume currently provided by the server 100 and corresponds to the virtualized volume number of the virtualized volume information 101. The virtualized volume size indicates a size of the virtualized volume. The number of physical volumes shows number of regions of the physical volume 400 constituting a virtualized volume. The physical volume number shows a physical volume 400 where the aforementioned region exists and corresponds to the physical volume number of the physical volume information 102. The device number indicates the storage device 300 where the physical volume 400 exists and corresponds to the device number of the physical volume information 102. The physical volume range indicates a range of the aforementioned region on the physical volumes 400. The snapshot attribute indicates whether the virtualized volume is related to the snapshot or not and indicates an attribute when related and may be a pair number (which will be detailed later) and may indicate whether the virtualized volume is a destination or a source. The concatenation order is a number starting from 1 and incremented by one when the region of the physical volume 400 constitutes the virtualized volume. The regions of the physical volumes 400 are concatenated according to the concatenation order, thereby constituting the aforementioned virtualized volume.

FIG. 7 is a table showing an example of the snapshot information 104 held by the server 100. Next, explanation will be given on this snapshot information 104. The snapshot information 104 is composed of a pair number, a group number, a source volume, a destination, and a state.

In the aforementioned, the pair number indicates a pair (virtualized volume pair) of a destination virtualized volume and a source virtualized volume of the snapshot managed by the server 100. The group number indicates a group to which the virtualized volume pair belongs. The source volume indicates a virtualized volume number of the source virtualized volume. The destination volume indicates a virtualized volume number of the destination virtualized volume. The state indicates a state of the virtualized volume pair: "being formed", "formation complete", "being divided", or "division complete" as will be detailed later.

Explanation has been given on the information held by the server 100. Next, explanation will be given on the information held by the controller 310 of the storage device 300. The in-device mapping information 312 is information synchronized with the mapping information 103.

FIG. 8 is a table showing an example of the in-device physical volume information 311 held by the controller 310 of the storage device 300. Next, explanation will be given on this in-device physical volume information 311. The in-device physical volume information 311 is composed of information items: a physical volume number, a SAN address, and state.

In the aforementioned, the physical volume number indicates the physical volume 400 which can be provided by the storage device 300. The SAN address indicates an address of the physical volume 400 in the SAN 600. The state indicates the state of the physical volume 400 such as "in use", "unused", "access prohibited", and "failed". The "in use" indicates that the data used by the host 200 is stored and can be accessed from the server 100 or the host 200. The "unused" indicates that no data is stored to be used by the host 200 and can be assigned as a destination volume. The "access prohibited" indicates that the volume is used as a destination volume but cannot be accessed from the server 100 or the host 200. For example, a destination volume whose division is not complete is in the "access prohibited" state. The operation of division will be detailed later. The "failed" indicates that the volume has an error and cannot be used. The controller 310 can extract a physical volume which can be allocated as a destination volume by using the state information. For performing this extraction at a high speed, it is possible to employ a list structure.

Figure 10:
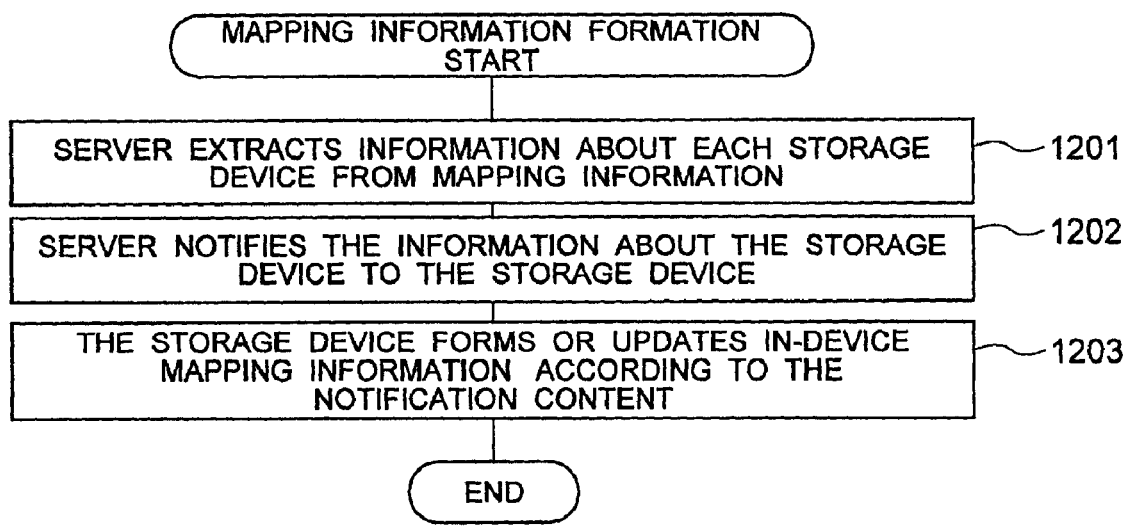
FIG. 10 is a flow chart explaining synchronization between the mapping information and the in-device mapping information.

FIG. 9 is a table showing an example of the in-device mapping information 312 held by the controller 310. FIG. 10 is a flow chart showing synchronization processing between the mapping information 103 and the in-device mapping information 312. Next, explanation will be given on this in-device mapping information 312 and its formation. The in-device mapping information 312 is composed of a virtualized volume number, a number of physical volumes, a concatenation order, a physical volume number, a physical volume range, and a snapshot attribute. The in-device mapping information 312 is created according to the flow of FIG. 10, for example, when initializing the information processing system according to the embodiment of the present invention. Next, explanation will be given on the processing of FIG. 10.

Firstly, the server 100 checks the mapping information 103 and extracts mapping of a virtualized volume relating to the physical volume 400 for the respective storage devices 300 (step 1201) and reports it to the storage devices 300 (step 1202). Upon reception of this report, the storage device 300 creates in-device mapping information 312 according to the report (step 1203). For example, when the configuration of the virtualized volume provided by the server 100 has been modified and the mapping information is modified, the server 100 and the storage device 300 perform a processing identical to the aforementioned, and the storage device 300 updates the in-device mapping information 312 for synchronization of the information. The virtualized volume number, the concatenation order, the physical volume number, the physical volume range, and the snapshot attribute of the in-device mapping information 312 correspond to the respective items of the mapping information 103. However, the physical volume number and the physical volume range of the in-device mapping information 312 include only those existing in the storage device 300 and even when the physical volume 400 constituting one virtual volume exists in a plurality of storage devices 300, the other storage devices are not contained and the concatenation order may be jumping values. The number of the physical volumes indicates the aforementioned physical volume number and the physical volume range and does not contain the other storage device 300.

FIG. 11 is a table showing an example of the in-device snapshot 313 held by the controller 310. Next, explanation will be given on this in-device snapshot information 313. The in-device snapshot information 313 is composed of a pair number, a group number, a source volume, a destination volume, a number of physical volume pairs (physical volume pair count) a source physical volume number, a destination physical volume number, and a state.

In the aforementioned, the pair number indicates a virtualized volume pair of the snapshot managed by the server 100 and the group number indicates a group (which will be detailed later) to which the virtualized volume pair belongs and they correspond to the pair number and the group number of the snapshot information 104. The source volume indicates a virtualized volume number of the source virtualized volume. The destination volume indicates a virtualized volume number of the destination virtualized volume. The source physical volume number indicates a physical volume number of the physical volume 400 having a region constituting the source virtualized volume. The destination physical volume number indicates a physical volume number of the destination physical volume 400.

In the embodiment of the present invention, the storage device 300 has the snapshot formation function on volume basis of the physical volume 400 and a virtualized volume snapshot formation is realized through that the storage device 300 creates a snapshot of the physical volume 400 constituting the virtualized volume. When a plurality of physical volumes are present to constitute the aforementioned virtualized volume, a plurality of pairs of physical volumes 400 (physical volume pair) are set. That is, there are the number of source physical volumes and the number of the destination physical volumes identical to the aforementioned number. The number of the physical volume pairs indicates the number of physical volume pairs. The state indicates a state of the virtualized volume pair corresponding to the snapshot information 104.

Figure 12:
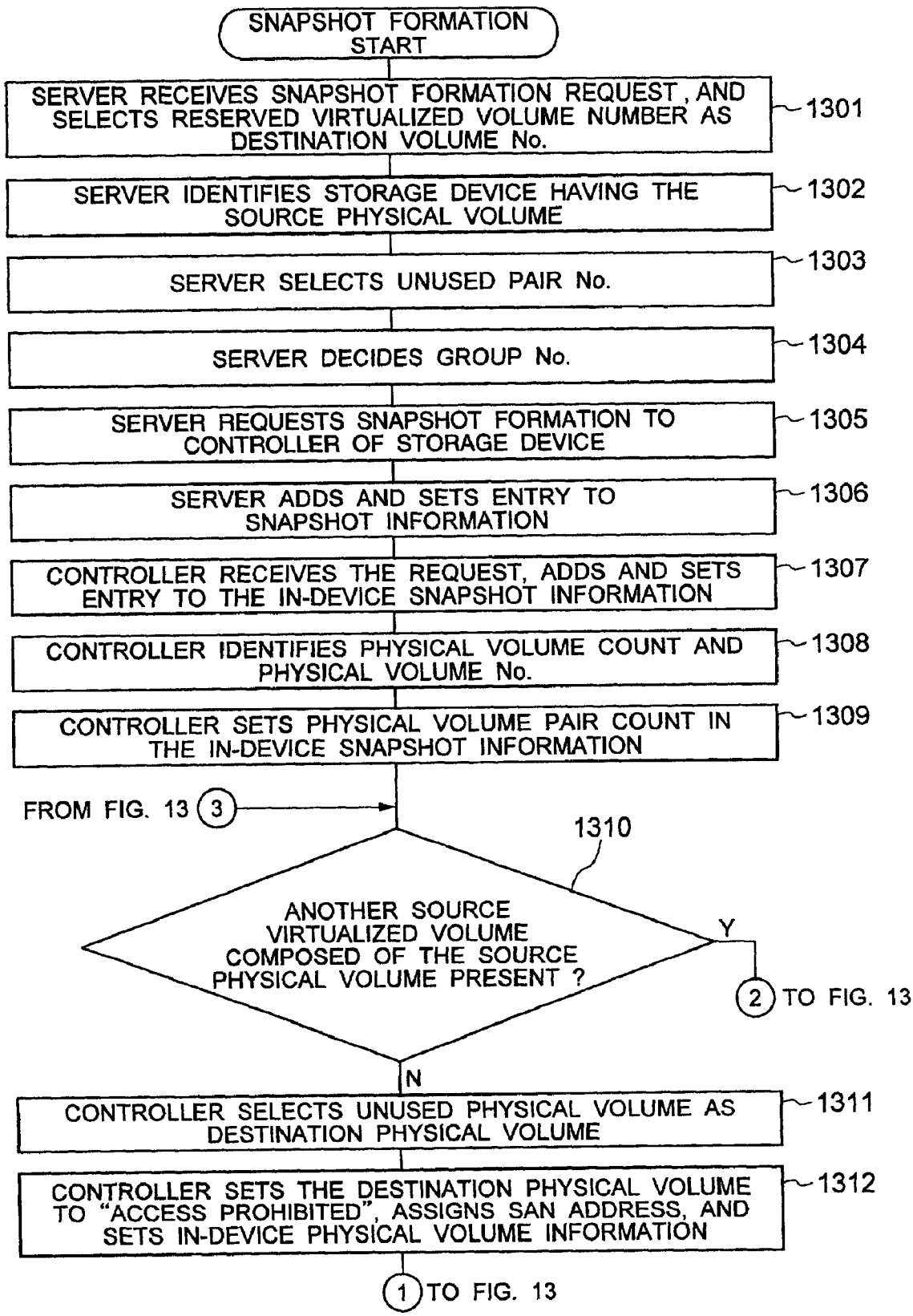
FIG. 12 is a flow chart explaining processing of that a storage device forms a physical volume snapshot corresponding to a virtualized volume by indication from the server.
Figure 13:
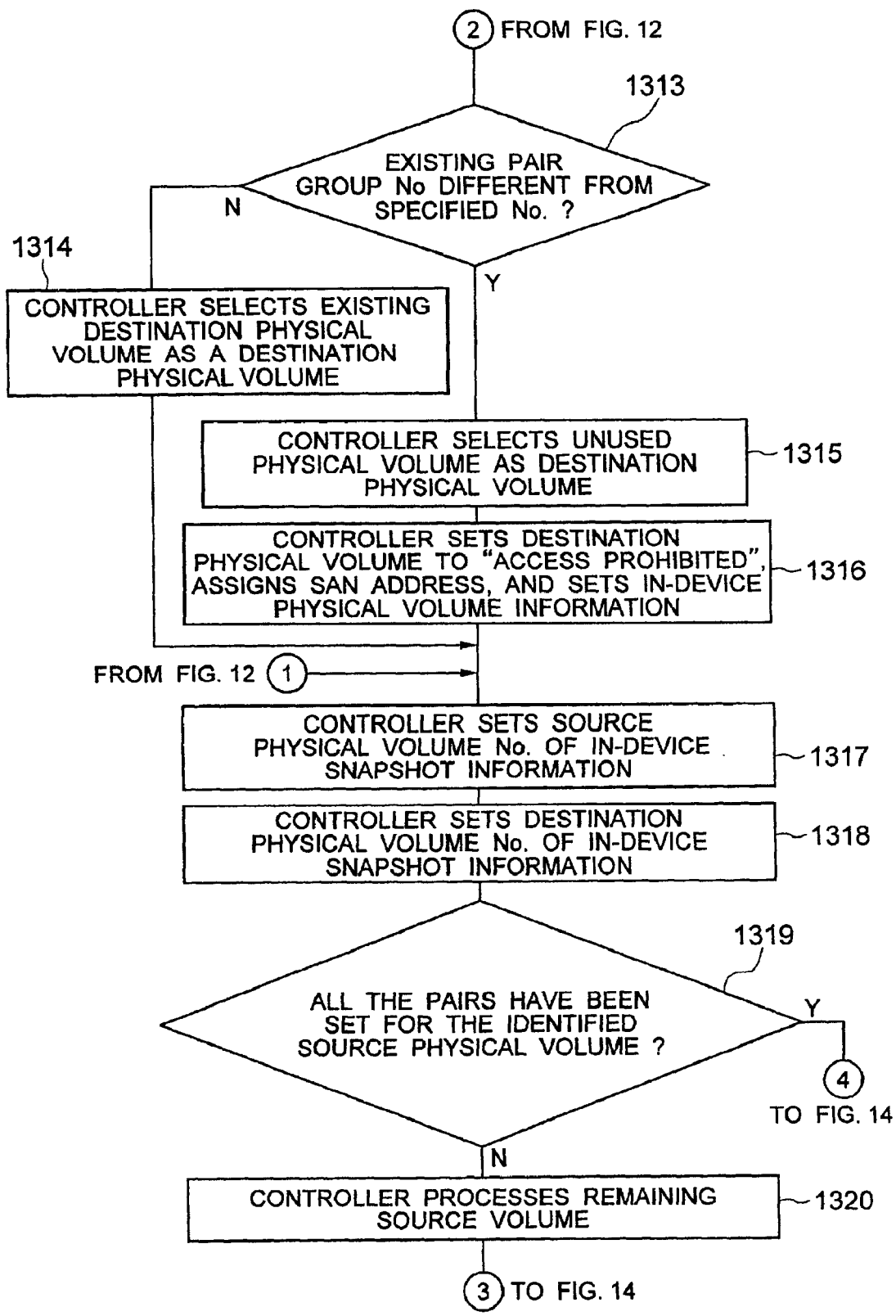
FIG. 13 is a continuation of the flow chart of FIG. 12.
Figure 14:
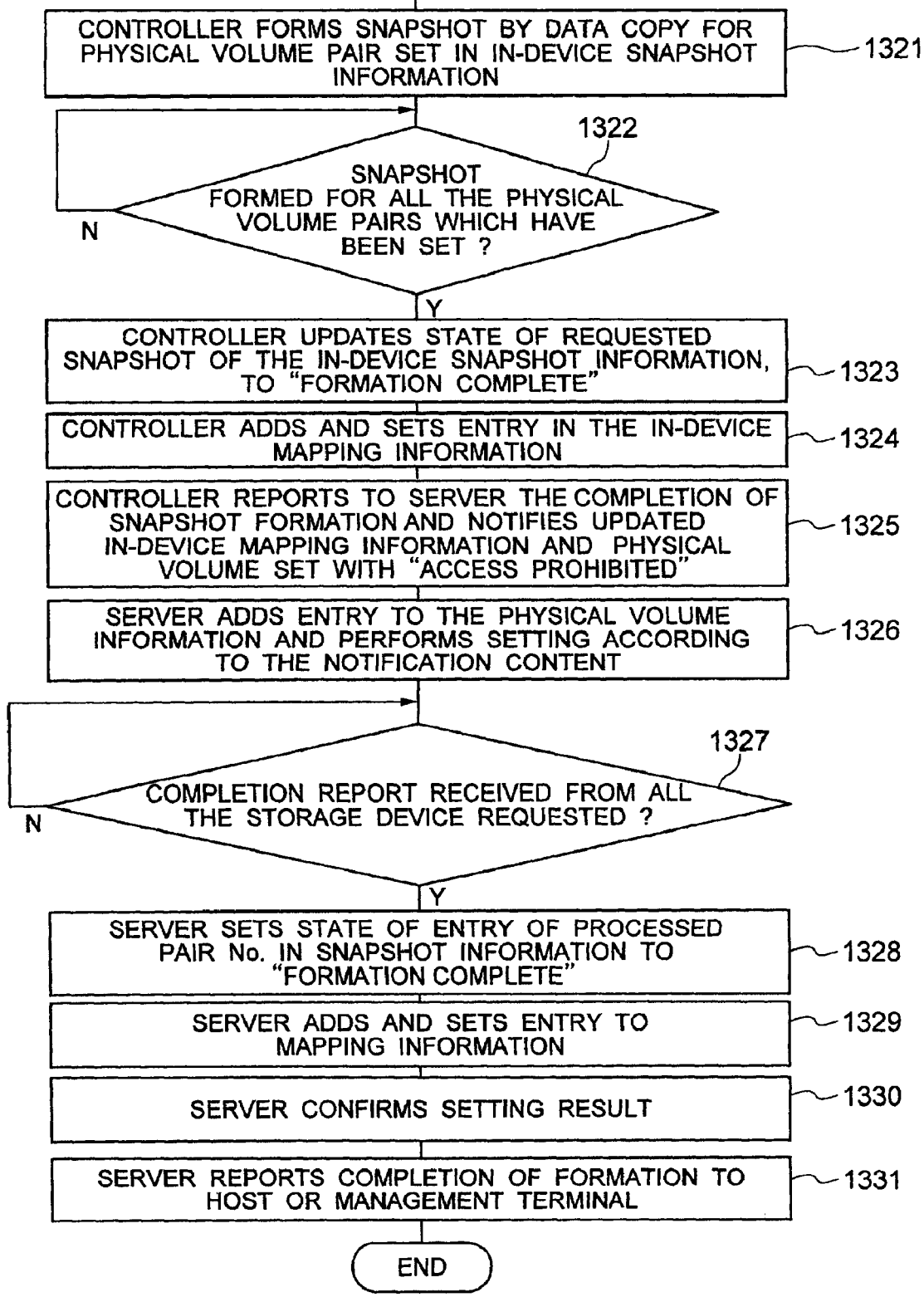
FIG. 14 is a continuation of the flow chart of FIG. 12 and FIG. 13.

FIG. 12, FIG. 13, and FIG. 14 show a continuous flow chart for creating a snapshot of the physical volume 400 corresponding to the virtualized volume by the storage device 300 according to an instruction from the server 100. Next, explanation will be given on the snapshot forming processing with reference to the flow chart.

(1) Upon reception of a snapshot forming request for a virtualized volume (source virtualized volume) from the host 200 or the management terminal 800, the server 100, by using the virtualized volume information 101, selects a unused virtualized volume number as a destination virtualized volume number and by using the mapping information 103, specifies a storage device 300 having the physical volume 400 constituting the source virtualized volume. The storage device 300 may be only one or there may be more than one (step 1301, 1302).

(2) Next, by using the snapshot information 104, the server 100 selects a unused pair number and determines a group number of the virtualized volume pair according to a snapshot forming request condition (which will be detailed later) and specifies a virtualized volume number of the source virtualized volume (source virtualized volume number), the aforementioned destination virtualized volume number, the aforementioned pair number, and the aforementioned group number and requests a snapshot formation to the controller 310 of the storage devices 300 via the network 700 or the SAN 600 (steps 1303 to 1305).

(3) Moreover, the server 100 adds a new entry to the snapshot information and sets the aforementioned values in the pair number, the group number, the source virtualized volume number, and the destination virtualized volume number, and sets the state to "being formed" (step 1306).

Here, explanation will be given on the group. The group is a set of the aforementioned virtualized volume pairs and each pair belongs to one of the groups. Because of the reason which will be detailed later, pairs belonging to different groups are assured to be divided and combined at independent timings. Pairs belonging to the same group are not assured to be divided and combined at independent timings. Accordingly, an identical group number is set when the division and combination for the pairs are performed at overlapped timing and when it is clear that the division and combination for the pairs are performed at the same timing.

(4) Returning back to the explanation of FIG. 12, the controller which has received the aforementioned request adds a new entry to the in-device snapshot information 313 and sets the values received in the aforementioned request, in the pair number, the group number, the source virtualized volume number, and the destination virtualized volume number and sets the state to "being formed" (step 1307).

(5) Furthermore, by using the in-device mapping information 312, the controller 310 identifies the number of physical volumes 400 (source physical volumes) in the storage device 300 constituting the specified source virtualized volume and the physical volume numbers of the physical volumes 400 and sets the numbers in the numbers of physical volume pairs in the in-device snapshot information 313 (steps 1308 and 1309).

(6) Furthermore, by using the in-device snapshot Information 313, the controller 310 checks whether any other source virtualized volume composed of the aforementioned source physical volume exists (step 1310).

(7) When the check in 1310 results in that no other virtualized volume exists, a destination physical volume is not yet set in the source physical volume and accordingly, the controller 310 selects a unused physical volume 400 by using the in-device physical volume information 311 and sets the state to "access prohibited" so as not to be accessed from the server 100 or the host 200. The controller 310 assigns a SAN address which can be allocated and is unused (steps 1311, 1312).

(8) When the check in 1310 results in that another virtualized volume does exist, a destination physical volume has been set in the source physical volume and accordingly, the controller 310 checks the group number of this virtualized volume pair by using the in-device snapshot information 313. When this check results in that the group number is identical to the group number specified by the server 100, the destination physical volume already set can be set as a destination physical volume of the snapshot requested (steps 1313 and 1314).

(9) When the check of step 1313 results in that the group number is different from the group number specified, a unused physical volume 400 is selected by using the in-device physical volume information 311, and the state is set to "access prohibited" so as not to be accessed from the server 100 or the host 200 and a SAN address which can be allocated and is unused is assigned (steps 1315 and 1316).

(10) After the processes of steps 1314 and 1316 or after the process of step 1312, the controller 310 sets the source physical volume number identified in the process of step 1308, in the source physical volume number of the in-device snapshot information 313, and sets the selected destination physical volume number on the destination physical volume number. That is, the aforementioned source physical volume and the destination physical volume become a physical volume pair (steps 1317 and 1318).

(11) The source physical volume identified in step 1318 may be one or more. When a plurality of source physical volumes are present, the controller 310 checks whether all the pairs have been set for the identified origination physical volumes. And if there is any pair not set, the processing from 1310 is repeated for the remaining source volume. The aforementioned processing is performed for all to determine destination physical volumes and to set the source physical volume numbers and the destination physical volume numbers of the in-device snapshot information 313 (steps 1319 and 1320).

(12) Next, by using the method and processing as disclosed in JP-A-2000-132343 for example, the controller 310 forms a snapshot by copying data with the physical volume pair which has been set in the in-device snapshot information 313. That is, the controller 310 has a bit map (difference information 314) indicating a difference between the volume regions of the physical volume pair prior to the snapshot formation and data copy is performed from the source to the destination for the region where the difference exists according to the difference information 314. The difference information 314 is turned off for the region whose copy is complete. Moreover, as shown in the aforementioned Publication, two types of the difference information 314 can be held to distinguish management of updating before and after the division. When the destination physical volume is already set for the source physical volume in step 1315 and the controller 310 has selected a new unused physical volume as the other destination physical volume, i.e., when the controller 310 has set a plurality of destination physical volumes for one source physical volume, a plurality of physical volume pairs exist for one source physical volume and the controller 310 forms a snapshot for each of the plurality of pairs. In this case, the controller has plurality of difference information 314 of the plurality of pairs and performs the aforementioned data copy (step 1321).

(13) The controller 310 checks whether snapshot formation is complete for all the pairs of the physical volumes 400 set in the in-device snapshot information 313. If complete, the controller 310 updates the snapshot state requested in the in-device snapshot information 313 to "formation completes" (steps 1322 and 1323).

(14) Next, the controller 310 adds a new entry to the in-device mapping information 312 and specifies how the destination virtualized volume is configured by the destination physical volume. That is, the controller 310 sets the aforementioned destination virtualized volume number in the virtualized volume number, sets the aforementioned number of the physical volumes in the physical volume count, sets the aforementioned destination physical volume number in the physical volume number, and sets the aforementioned pair number and the destination in the snapshot attribute. Moreover, the controller 310 sets as the concatenation order, the concatenation order of the source physical volume forming a pair with the aforementioned destination physical volume and sets as the physical volume range, the physical volume range of the aforementioned source physical volume. The concatenation order and the physical volume range are fetched from the source virtualized volume of the mapping information 312 (step 1324).

(15) Next, the controller 310 reports completion of the requested snapshot formation to the server 100 via the network 700 or the SAN 600. Here, the controller 310 reports an updated portion of the in-device mapping information 312: the configuration of the destination virtualized volume set in step 1324 by the aforementioned destination physical volume; the physical volume number set to "access prohibited" in steps 1312 and 1316; and its SAN address (step 1325).

(16) The server 100 which has received the report and notification adds to the physical volume information 102, an entry for the physical volume whose state has become "access prohibited"; sets the device number of the storage device 300; sets the physical volume number and the SAN address according to the aforementioned notification; sets the state to "access prohibited"; fetches and sets the remaining items from the storage device 300 by using the SCSI INQUIRY command, the MODE SENSE command, and the like (step 1326).

(17) Furthermore, the server confirms reception of the report of the aforementioned snapshot formation completion, the mapping information and the physical volume information from all the storage devices 300 having the physical volumes 400 constituting the aforementioned source virtualized volume which has been identified in step 1302 and has requested the snapshot formation in step 1305. If all of them have been received, the server 100 sets the state in the entry of the aforementioned pair number in the snapshot information 104 to "formation complete" and adds a new entry to the mapping information 103. Moreover, according to the notification contents, the server 100 sets the virtualized volume number of the destination virtualized volume in the virtualized volume number and accumulates the physical volume range size of the destination physical volume in the virtualized volume size. Moreover, the server 100 accumulates the number of the destination physical volume in the physical volume count and further sets the concatenation order, the device number, the physical volume number, the physical volume range, and the snapshot attribute from the aforementioned notification contents and device number of the storage device 300 which has performed the notification. That is, by using the notification contents from the controller 310 of the storage device 300, the server 100 reflects the update of the in-device mapping information 312 held by the controller 310, on the mapping information 103 so as to synchronize between the information items (steps 1237 to 1239).

(18) Next, compares information related to the source virtualized volume to information related to the destination virtualized volume in the mapping information 103 and confirms that the virtualized volume size is matched and the number of physical volumes is matched. Furthermore, the server 100 confirms that the physical volume concatenation order is continuous without jumping (skipping) (1330).

(19) Next, the server 100 reports the snapshot completion to the host 200 or to the management terminal 800 and terminates the processing (step 1331).

As has been described above, according to the instruction from the server 100, the storage device 300 forms a snapshot of the physical volume 400 corresponding to the virtualized volume. Accordingly, the server 100 can prepare for fetching the snapshot of the virtualized volume by one instruction to the storage device 300 without causing a load to the server 100 such as data copy.

Moreover, in the aforementioned processing, by using the notification contents from the controller 310 of the storage device 300, the server 100 reflects update of the in-device mapping information 312 held by the controller 310 on the mapping information so as to synchronizing between the information items. Accordingly, the server 100 can always recognize the physical volume 400 constituting the destination virtualized volume in spite of the new allocation/play-and-plug operation of the physical volume 400 constituting the destination virtualized volume. For example, when a source physical volume and a destination physical volume have identical contents, the server 100 can prevent the problems such as incorrect storage management or processing failure (in recognition of the source physical volume and the destination physical volume).

Figure 15:
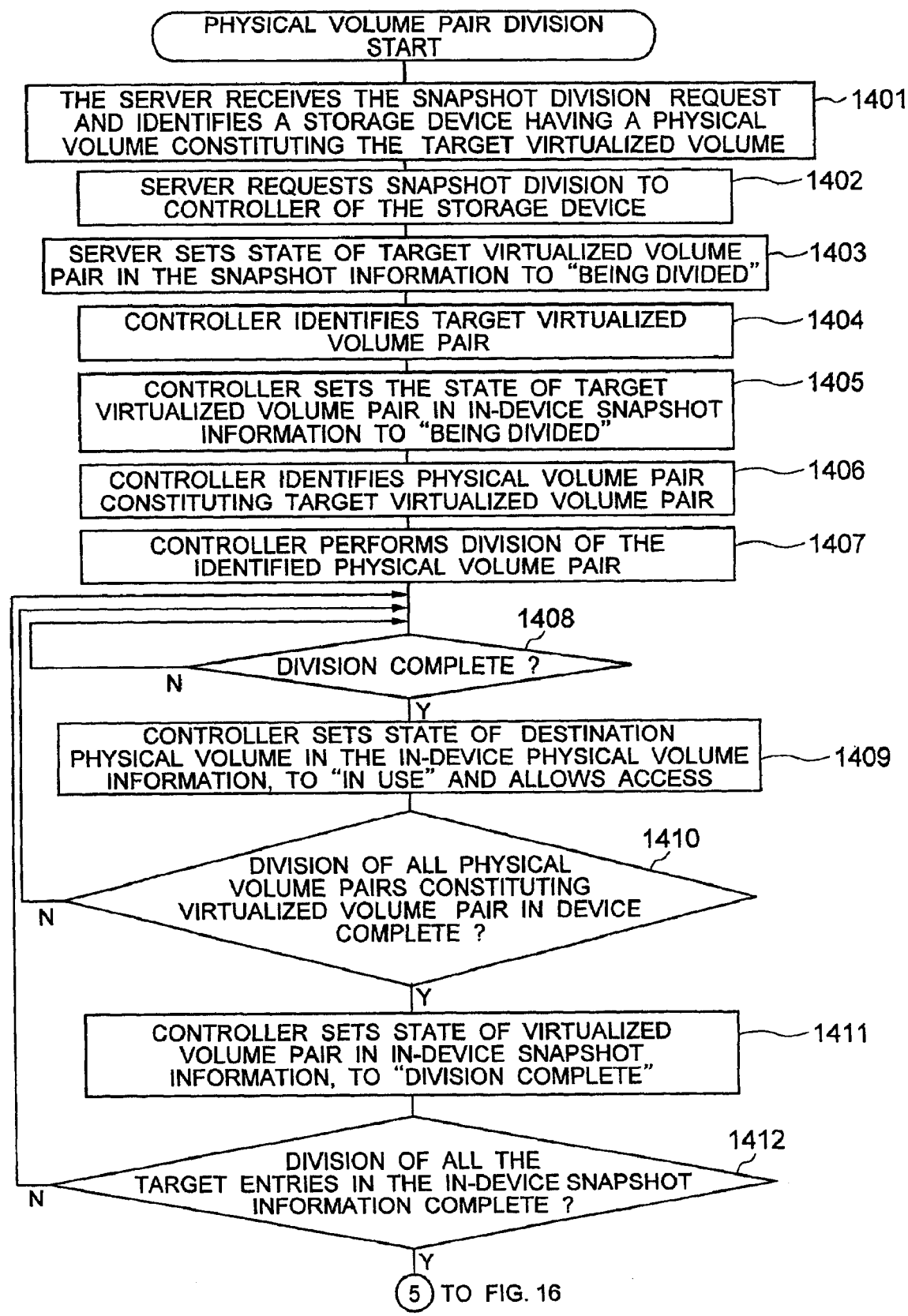
FIG. 15 is a flow chart explaining processing of that the storage device divides a physical volume pair corresponding to a virtualized volume specified by the server.
Figure 16:
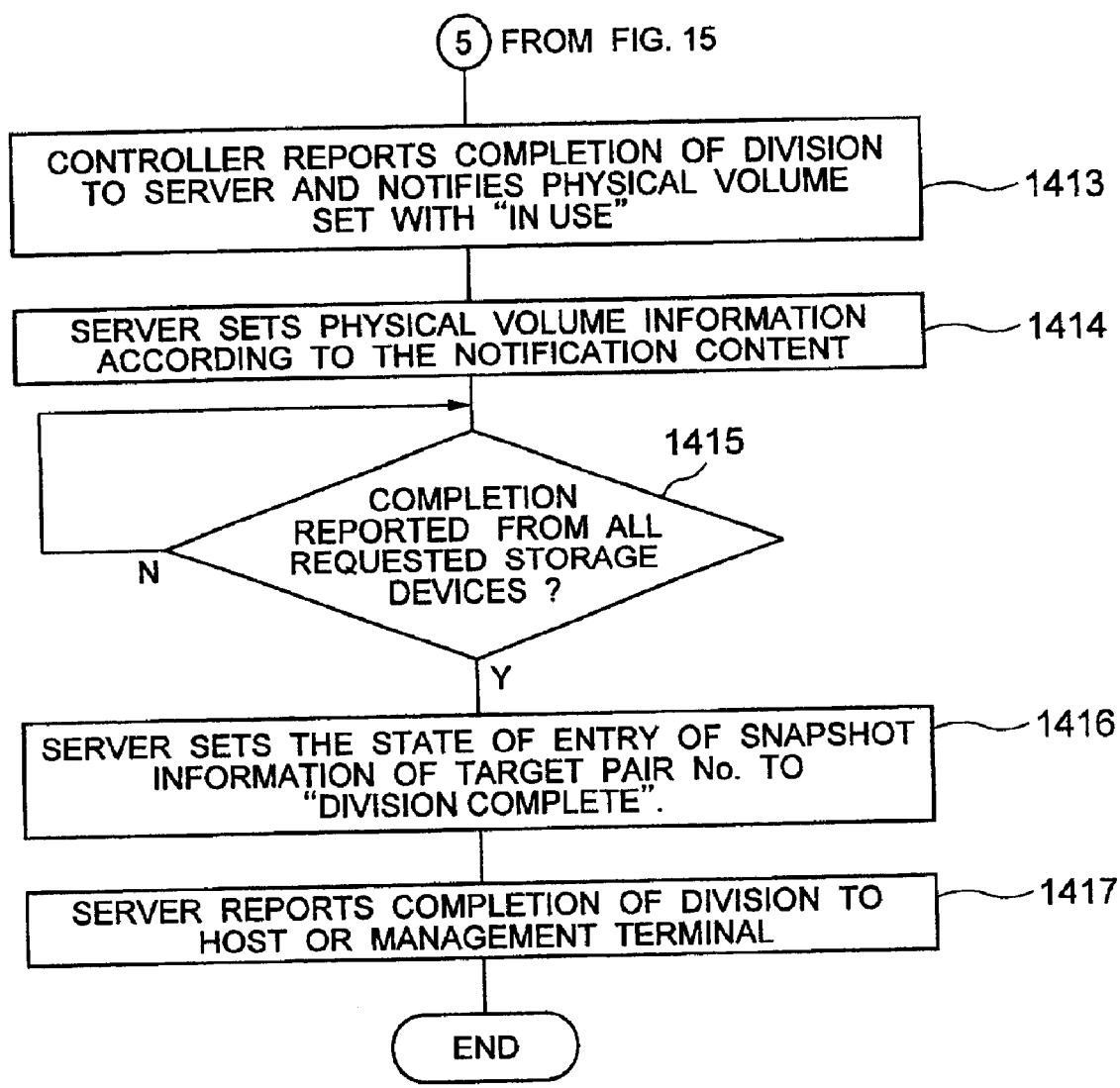
FIG. 16 is a continuation of the flow chart of FIG. 15.

FIG. 15 and FIG. 16 are a continuous flow chart showing a division processing according to an instruction of the server 100 with a virtualized volume specified, for dividing a pair of the physical volumes 400 corresponding to the virtualized volume.

(1) Upon reception of a pair division request related to a virtualized volume from the host 200 or the management terminal 800, the server 100, by using the mapping information 103, identifies a storage device 300 having the physical volume constituting the virtualized volume, specifies the virtualized volume number in the controller 310 of the storage device 300, and requests a pair division related to the virtualized volume via the network 700 or the SAN 600. The storage device 300 may be one or there are more than one storage devices 300. Moreover, the server 100 identifies a virtualized volume pair in which the virtualized volume in the snapshot information 104 is a destination or source and sets the state to "being divided" (steps 1401 to 1403).

(2) Upon reception of the aforementioned request, the controller 310, by using the in-device snapshot information 313, Identifies a virtualized volume pair number which the virtualized volume is a source or destination and sets the state in the entry of the pair number to "being divided". The aforementioned pair number may be only one or there may be more than one. Next, the controller 310 identifies a physical volume in the entry of the pair number in the in-device snapshot information 313 (steps 1404 to 1406).

(3) Next, the controller 310 divides the physical volume according to the method and processing as disclosed, for example, in JP-A-2000-132343. That is, the controller 310 has a bit map (difference information 314) as information for the physical volume pair indicating a difference between the volume ranges from the snapshot formation and to the division. Referencing the difference information 314, the controller 310 performs data copying from the source to the destination where a difference is present and turns the difference information off for the region whose copying is complete. When there are a plurality of physical volume pairs for one or more virtualized volume pairs, the pair divisions are all performed without a time difference. This processing of the pair divisions without a time difference will be detailed later (step 1407).

(4) After confirming that the physical volume division is completed by the processing of step 1407, the controller 310 sets the state in the entry of the destination physical volume of the aforementioned physical volume pair to "in use" and allows access to the physical volume (steps 1408 and 1409).

(5) The controller 310 checks whether division is complete for all the physical volume pairs existing in the entry in the in-device snapshot information 313. If not complete, the controller continues the processing from step 1408. If the division is complete for all the physical volume pairs existing in the entry in the in-device snapshot information 313, the controller sets the state in the entry to "division complete" (steps 1410 and 1411).

(6) Furthermore, the controller 310 checks whether division is complete for all the entries in the in-device snapshot information 313. If No, the controller 310 continues the processing from step 1408. If division is complete for all the entries in the in-device snapshot information 313, the controller 310 reports completion of the requested division to the server 100 via the network 700 or the SAN 600 and notifies the physical volume number whose state is set to "in use" in step 1408 (steps 1412 and 1413).

(7) Upon reception of the report and notification in the processing of step 1413, the server 100, according to the report contents and the device number of the storage device 300, sets the state in the entry of the physical volume in the physical volume information 102 to "in use" (step 1414).

(8) Furthermore, the server 100 checks whether the division completion report and notification have been received from all the storage devices 300 which were identified in the processing of step 1401 and requested virtualized volume pair division in the processing of step 1402. After this confirmation, the server 100 sets the state in the entry of the pair number in the snapshot information 104 to "division complete" and reports the division completion to the host 200 or the management terminal 800, thereby terminating the processing (steps 1415 to 1417).

Figure 17:
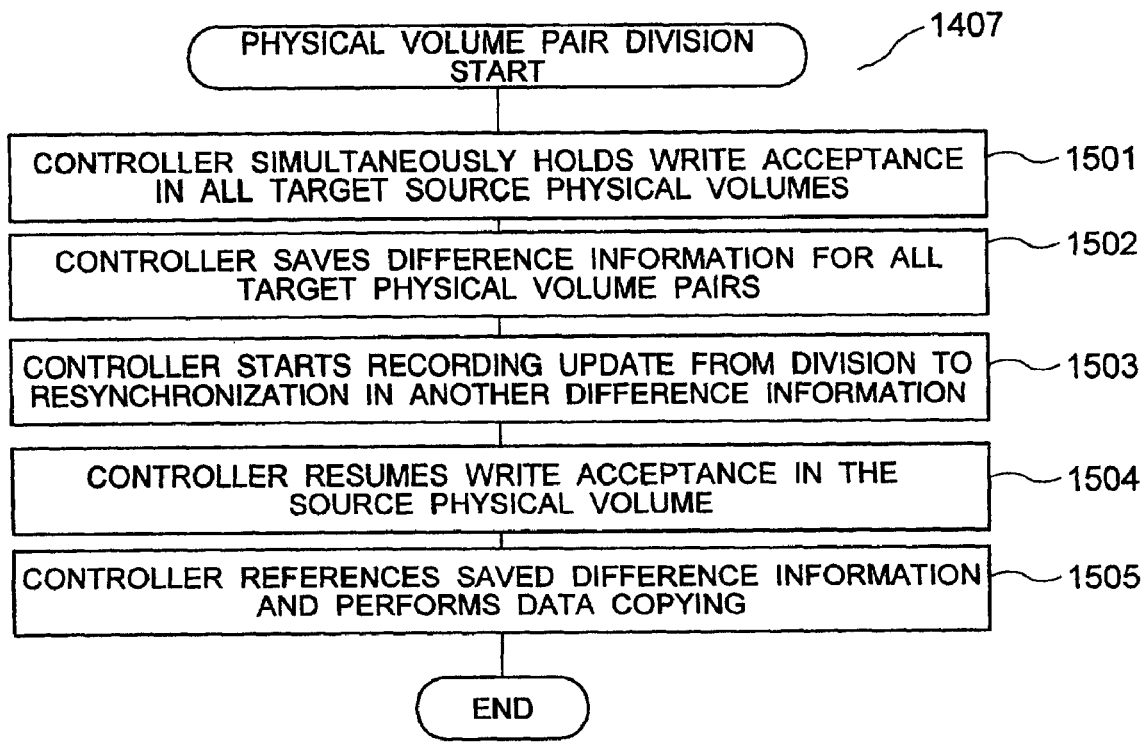
FIG. 17 is a flow chart explaining an example of performing the division of the physical volume pair by the processing of a step 1407 without a time difference.

FIG. 17 is a flow chart showing an example of physical volume pair division by the processing of step 1407 without a time difference. Next, explanation will be given on this.

The controller 310 simultaneously holds acceptance of write from the server 100 or the host 200 for a source physical volume of the respective physical volume pairs (step 1501) and saves the aforementioned difference information 314 for all the pairs (step 1502), so that update from the division to the resynchronization is recorded in another difference information 314 (step 1503). The controller 310 resumes write acceptance (step 1504) and performs data copying by referencing the difference information 314 which has been saved (step 1505).

As has been described above, since the division of a physical volume pair can be performed only by saving the difference information 314, it is possible to reduce the write acceptance hold time.

In the processing explained with reference to FIG. 15 to FIG. 17, a virtualized volume specified by the host or the management terminal 800 may be a source or a destination of a pair. However, the processing may be performed only for either of the source or the destination. Moreover, in the aforementioned, explanation has been given on a pair division with specification of a virtualized volume. However, the pair division processing can also be performed by specifying a pair number or a group number.

Figure 18:
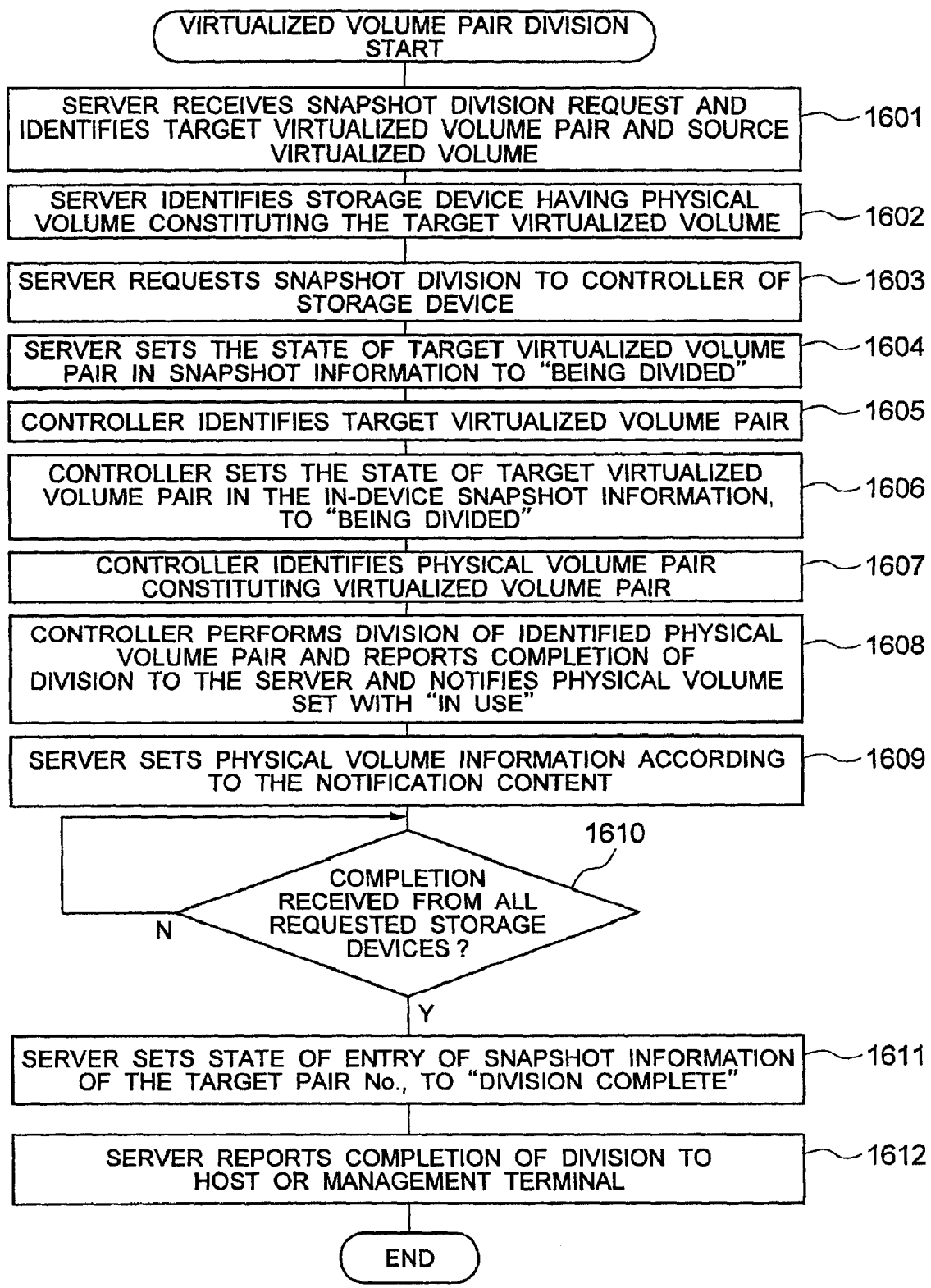
FIG. 18 is a flow chart explaining a division processing operation of the virtualized volume pair indicating a pair number and a group number.

FIG. 18 is a flow chart showing a division processing with specification of a pair number or a group number. Next, explanation will be given on this case.

(1) Upon reception of a division request of a virtualized volume pair with specification of a pair number or a group number from the host 200 or the management terminal 800, the server 100, by using the snapshot information 104, identifies a pair having the specified pair number or the group number and source virtualized volume of the pair (1601); and by using the mapping information 103, the server 100 identifies a storage device 300 having the physical volume constituting the source virtualized volume (steps 1601 and 1602).

(2) The server 100 requests division of the virtualized volume pair via the network 700 or the SAN 600 with specifying the pair number or the group number in the controller 310 of the storage device 300. The storage device 300 may be realized by one or more storage devices 300. Moreover, the server 100 sets the state in the entry of the pair in the snapshot information 104 to "being divided" (steps 1603 and 1604).

(3) Upon reception of the request from the server 100 in step 1603, the controller 310, by using the in-device snapshot information 313, identifies an entry whose pair number and group number are matched with the aforementioned specification, and sets the state in the entry to "being divided". In this specification, when a pair number is specified, the entry is one but when a group number is specified, the entry may be only one or there may be more than one entry (steps 1605 and 1606).

(4) Next, the controller 310 identifies a physical volume pair of the entry. Independently of the number of the entries, the physical volume pair may be only one or there may be a plurality of physical volume pairs. The controller 310 executes the processes of steps 1407 to 1413 explained with reference to FIG. 15 and FIG. 16. When there are a plurality of physical volume pairs, the controller 310 executes division of the pairs without a time difference (steps 1607 and 1608).

(5) Upon reception of the report that the division is complete and notification of the physical volume which has become "in use", the server 100 sets the state in the entry of the physical volume in the physical volume information 202 to "in use" according to the notification content and the device number of the storage device 300 (step 1609).

(6) Furthermore, the server 100 confirms that the division complete report and notification have been received from all the storage devices 300 which have been identified in step 1602 and requested the virtualized volume pair division in step 1603. After the confirmation, the server 100 sets the state in the entry in the snapshot information 104 to "division complete" and reports the division complete to the host 200 or the management terminal 800 (steps 1610 to 1612).

As has been described above, the storage device 300 executes division of the physical volume pair corresponding to the virtualized pair by an instruction from the server 100. Even when a plurality of virtualized volume pairs are specified by specifying a virtualized volume or a group instead of the pair number, the server 100 can realize the virtualized volume pair division by only one instruction to the respective storage devices 300.

Moreover, when the virtualized volume pair division is accompanied by division of a plurality of physical volume pairs, the division of the plurality of physical volume pairs can be performed without a time difference. Thus, for a virtualized volume or its group to be divided, a pair can be divided by the storage device 300 while maintaining data matching and a snapshot can be obtained.

Figure 19:
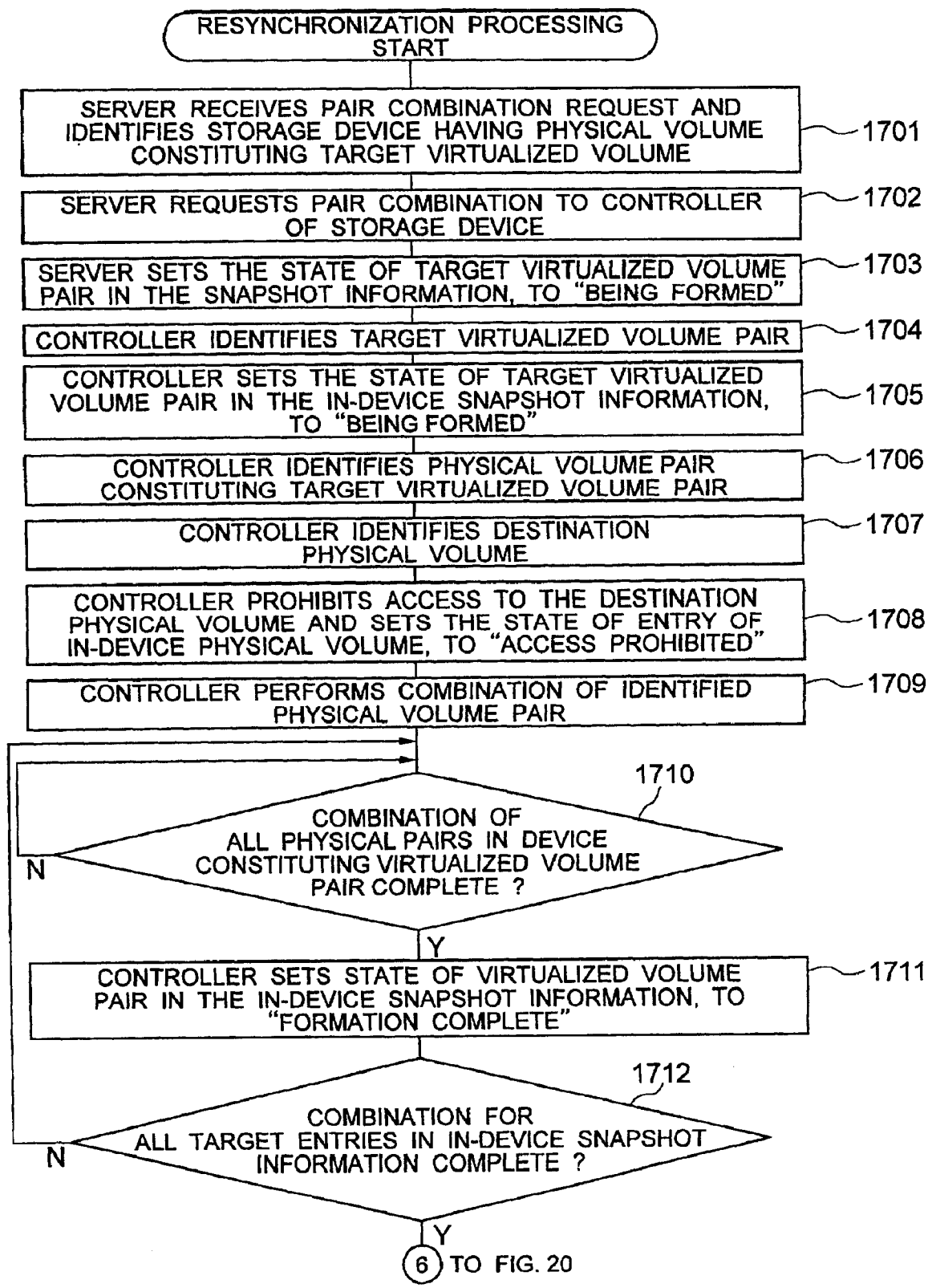
FIG. 19 is a flow chart explaining a processing operation of resynchronization (combination of the pairs).
Figure 20:
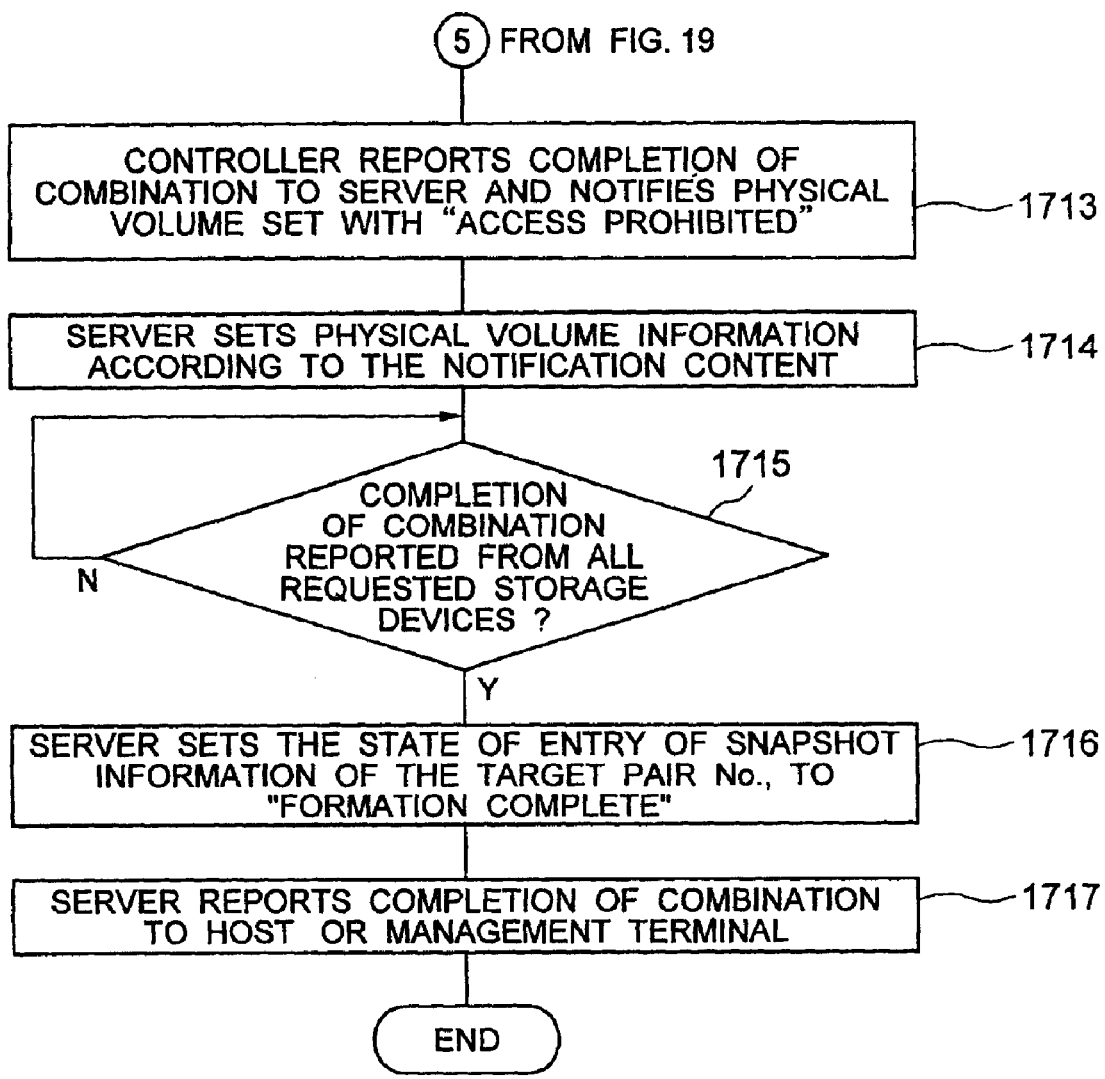
FIG. 20 is a continuation of the flo chart of FIG. 19.

FIG. 19 and FIG. 20 are a continuous flow chart showing processing of resynchronization (pair combination). Next, referring to the flow chart of FIG. 19 and FIG. 20, explanation will be given on resynchronization. That is, according to an instruction by the server 100 with specifying a virtualized volume, the storage device 300 resynchronizes (combines the pair) data to be stored in the source physical volume and in the destination physical volume for the physical volume 400 corresponding to the virtualized volume, thereby resynchronizing stored data of a virtualized volume pair related to the aforementioned virtualized volume. Explanation will be given on this processing.

(1) Upon reception of a pair combination request related to a virtualized volume from the host 200 or the management terminal 800, the server 100, using the mapping information 103, identifies a storage device 300 having the physical volume constituting the aforementioned virtualized volume and requests a pair combination related to the virtualized volume via the network 700 or the SAN 600 with specifying the virtualized volume number in the controller 310 of the storage device 300. The storage device 300 may be only one or there may be a plurality of the storage devices 300 (steps 1701 and 1702).

(2) Moreover, the server 100 identifies a pair whose virtualized volume is a destination or a source in the snapshot information 104 and sets the state to "being formed" (step 1703).

(3) Upon reception of a request in step 1702, the controller 310, by using the in-device snapshot information 313, identifies a pair number of a virtualized volume pair in which the aforementioned virtualized volume is a source or a destination virtualized volume and sets the state in the entry of the pair number to "being formed". The pair number may be only one or there may be a plurality of pair numbers (steps 1704 and 1705).

(4) Next, the controller 310 identifies a physical volume pair of the entry of the pair number in the in-device snapshot information 313 and identifies a destination physical volume of the aforementioned volume pair (steps 1706 and 1707).

(5) Next, the controller 310 prohibits access to the aforementioned destination physical volume from the server 100 or the host 200 and sets the state in the entry for the aforementioned destination physical volume in the in-device physical volume information 311 to "access prohibited" (step 1708).

(6) Next, according to the method and processing disclosed in JP-A-2000-132343, the controller 310 executes combination of the aforementioned physical volume pair. That is, the controller 310 has a bit map (difference information 314) indicating a difference between the volume regions from the division to the combination of the physical volume pair. Referencing the difference information 314, the controller 310 performs data copy from a source to a destination for the regions where a difference is present and turns off the difference information 314 where the copying is complete (step 1709).

(7) The controller confirms that combination is complete for all the physical volume pairs existing in the aforementioned entry in the in-device snapshot information 313. After this confirmation, the controller 310 sets the aforementioned state in the entry to "formation complete" (steps 1710 and 1711).

(8) Furthermore, the controller 310 checks whether combination is complete for all the entries in the in-device snapshot information 313. If not complete, the controller 310 again executes the processing from the step 1710. When the combination is complete for all aforementioned entries, the controller 310 reports completion of the requested combination via the network 700 or the SAN 600 and notifies the physical volume number which has been set to "access prohibited" in the process of step 1708 (steps 1712 and 1713).

(9) Upon reception of the report and notification in the process of step 1713, according to the notification content and the device number of the storage device 300, the server 100 sets the state in the entry of the physical volume in the physical volume information 102 to "access prohibited" (step 1714).

(10) Furthermore, the server 100 confirms that the aforementioned combination complete report and notification have been received from all the storage devices 300 which have been identified in step 1701 and have requested a virtualized volume pair combination in step 1702. After this confirmation, the server 100 sets the state in the entry of the pair number in the snapshot information 104 to "formation complete" and reports the completion of combination to the host 200 or to the management terminal 800, thereby terminating the processing (steps 1715 to 1717).

In the aforementioned processing, the virtualized volume specified by the host 200 may be a source or may be a destination in the pair. That is, both cases can be processed. However, it is also possible to process only one of the cases.

Moreover, explanation has been given on a pair combination with specifying of a virtualized volume. A pair combination with specifying of a pair number or a group number can also be processed like in the pair division processing by replacing the "division", "being divided", "in use", and "division complete" in the pair division processing of steps 1601 to 1612 in the flow chart of FIG. 18 with "combination", "being formed", "access prohibited" and "formation complete".

As has been described above, the storage device 300 performs combination of a physical volume pair corresponding to a virtualized volume pair according to an instruction of the server 100, so that not only with specifying the pair number but also with specifying a virtualized volume and a group where a plurality of virtualized volume pairs may be present, the server 100 can realize a virtualized volume pair with one instruction to the respective storage devices 300.

By performing the aforementioned snapshot formation processing, in a plurality of virtualized volume pairs having different group numbers, even when the source physical volume is identical, the source physical volume can be handled as different volumes, i.e., the physical volume pairs are different. This enables the aforementioned division and combination for the respective virtualized volume pairs at independent timings. That is, division and combination of one of the virtualized volume pairs need not be affected by the other virtualized volume pair.

In the aforementioned, when different numbers are assigned for all the virtualized volume groups, it is necessary to prepare separate destination physical volumes for the respective virtualized volume pairs and there may arise shortage of the physical volume 400 of the storage device 300. To prevent this, an identical group number can be assigned for virtualized volume pairs which are divided and combined at the same timing.

As an example of performing division or combination at the same timing, there is a case when a plurality of data items used by the host 200 are dispersed in a plurality of virtualized volumes and snapshot of the aforementioned virtualized volumes is used for backup of the data items and data sharing/passing between databases. There is also a case when data, Index, log used by DBMS on the host 200 are dispersed in a plurality of virtualized volumes and snapshot is simultaneously used for backup. Moreover, for virtualized volume pairs whose division and combination will not be overlapped, it is possible to assign an identical group number. Moreover, it is possible to prepare a particular group number (such as 0) to be assigned for a virtualized volume pair whose division and combination need not be performed at an arbitrary timing.

In the aforementioned example, the group number is indicated by a numeric and processing is performed referencing the numeric. However, it is also possible to show such information as a bit map. For example, if a certain bit is ON, it means that division or combination need not be performed at an arbitrary timing.

Figure 21:
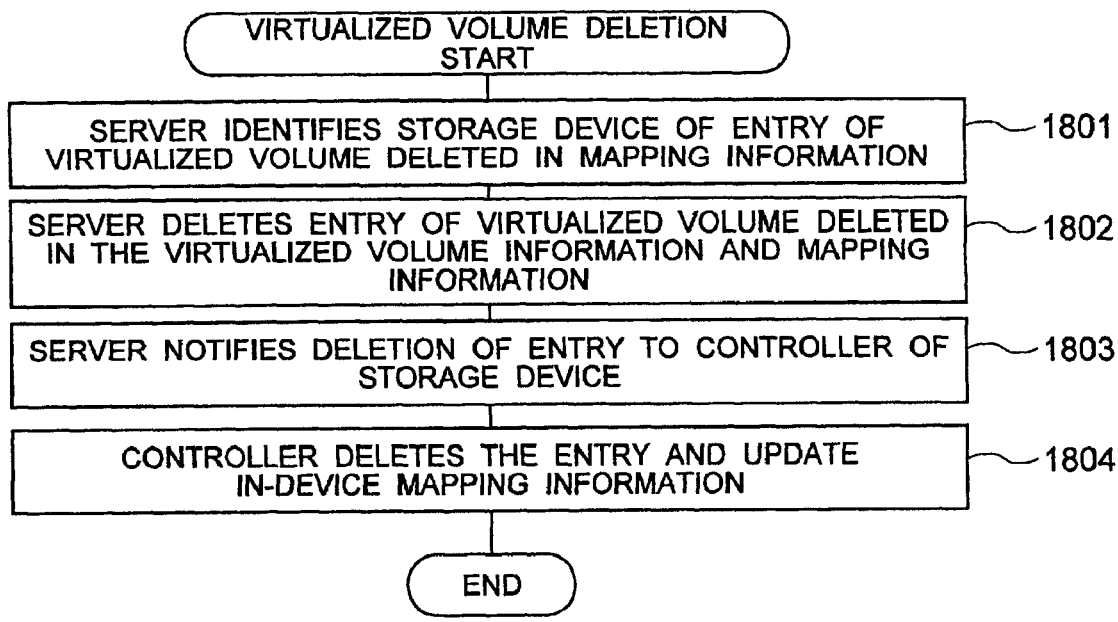
FIG. 21 is a flow chart explaining a processing operation in a case where the virtualized volume is deleted.

FIG. 21 is a flow chart showing a processing operation for deleting a virtualized volume. Next, explanation will be given on this.

(1) Firstly, by using the mapping information 103, the server 100 identifies a storage device 300 of an entry of the aforementioned virtualized volume and deletes the entry of the virtualized volume in the virtualized volume information 101 and the mapping information 103 (steps 1801 and 1802).

(2) Next, the server 100 notifies deletion of the virtualized volume to the controller 310 of the aforementioned storage device 300 (step 1803).

(3) Upon reception of the notification of the virtualized volume deletion, the controller 310 deletes the entry in the in-device mapping information 312 and synchronizes information between the server 100 and the controller 310, thereby terminating the processing. However, in the mapping information 103, when the aforementioned virtualized volume is a destination or a source, it is impossible to delete the entry (step 1804).

Figure 22:
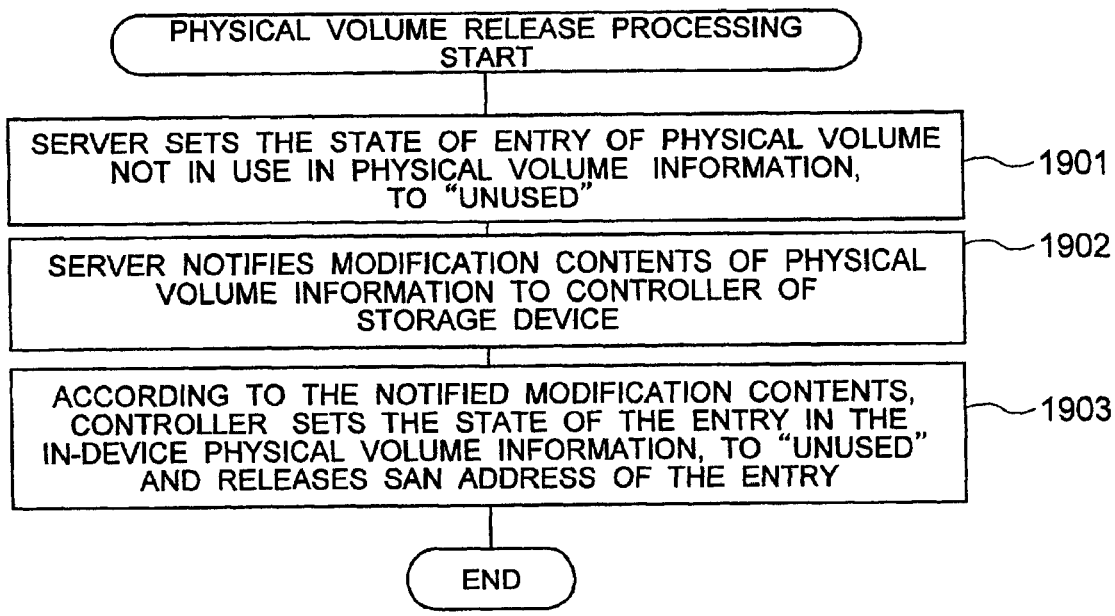
FIG. 22 is a flow chart explaining a processing operation in a case where the physical volume is not used at all.

FIG. 22 is a flow chart of a processing operation performed when the physical volume 400 has become not used at all. Next, explanation will be given on this case.

(1) When the physical volume 400 has become not used at all, the server 100 sets the state in the entry of the physical volume in the physical volume information 102 to "unused" and notifies the modification content to the controller 310 of the storage device 300 (steps 1901 and 1902).

(2) Upon reception of the aforementioned notification, the controller 310, according to the modification content notified, sets the state in the entry to "unused" in the in-device physical volume information 311 and releases the SAN address of that entry, thereby terminating the processing (step 1903).

Figure 23:
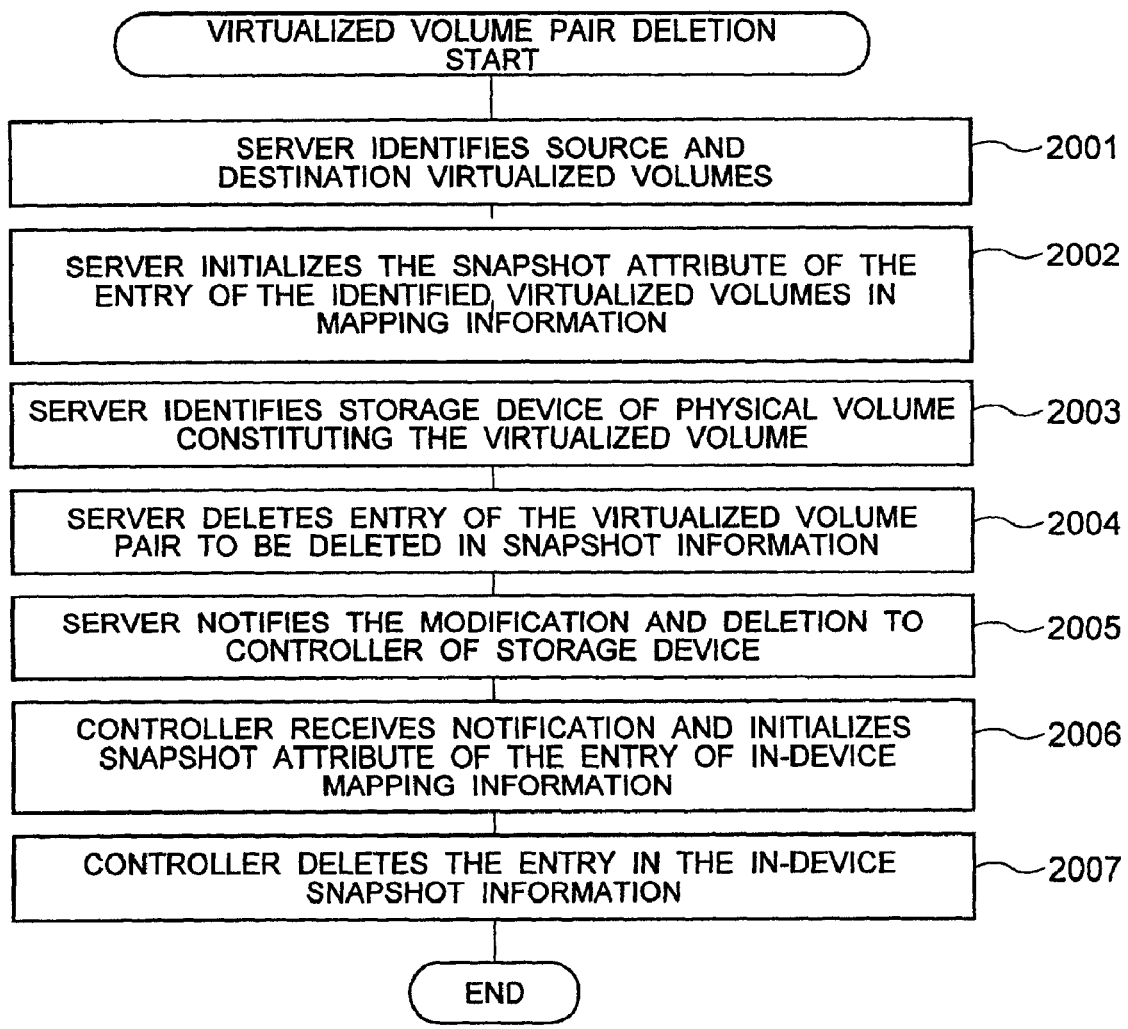
FIG. 23 is a flow chart explaining a processing operation in a case where the virtualized volume pair is deleted.

FIG. 23 is a flow chart showing a processing operation performed when a virtualized volume pair is deleted. Next, explanation will be given on this.

(1) Firstly, by using the snapshot information 104, the server 100 identifies a virtualized volume of the source and that of the destination and initializes the snapshot attribute of the entry of the aforementioned virtualized volume (steps 2001 and 2002).

(2) Furthermore, the server 100 identifies a storage device 300 of the physical volume 400 constituting the aforementioned virtualized volume, deletes the entry of the aforementioned virtualized volume pair in the snapshot information 104, and notifies the modification and deletion to the controller 310 of the aforementioned storage device 300 (steps 2003 to 2005).

(3) Upon reception of the notification, the controller 310 initializes the snapshot attribute of that entry in the in-device mapping information 312, deletes the entry in the in-device snapshot information 313, and synchronizes information between the server 100 and the controller 310, thereby terminating the processing (steps 2006 and 2007).

In the aforementioned, as the interface and protocol for information updating and notification by the server 100, the controller 310, and the management terminal 800, for example, it is possible to use MIB reference/update by the SNMP, CIM reference/update by XML document transferred by the HTTP, or the like.

Figure 24:
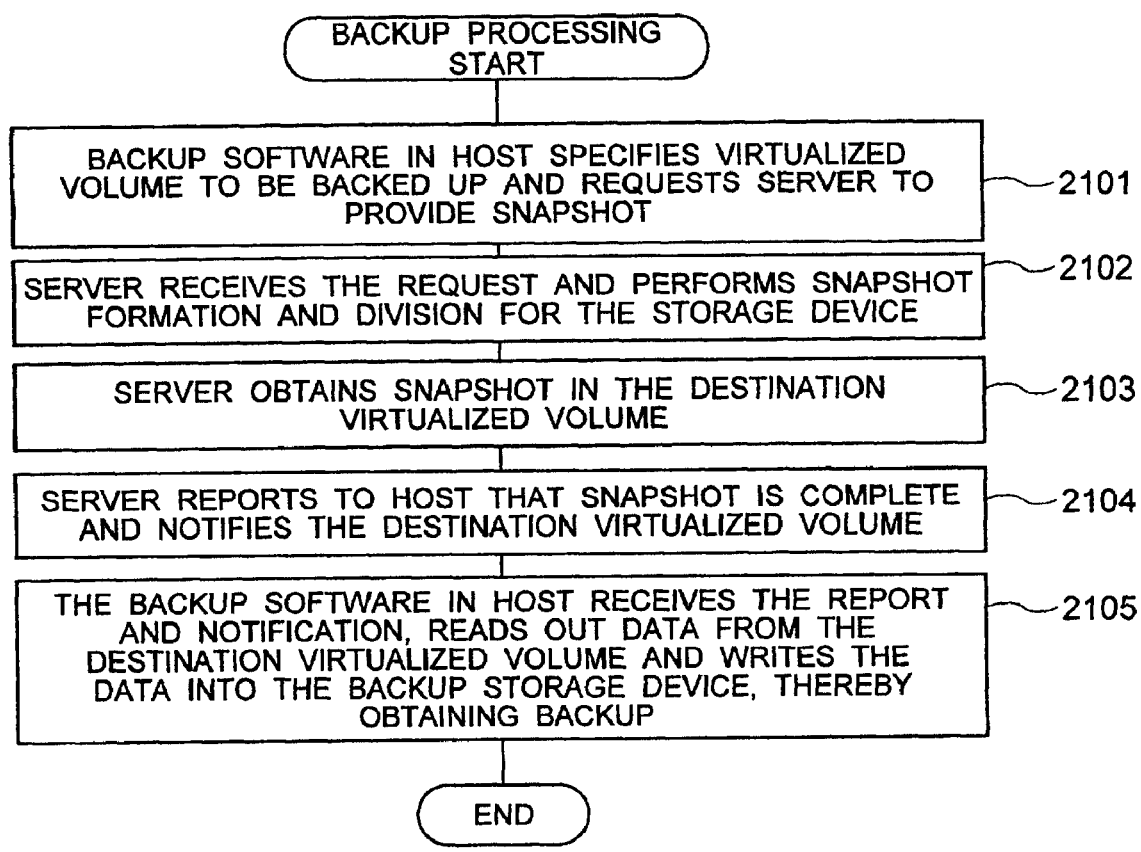
FIG. 24 is a flow chart explaining a processing operation by which a backup is obtained.

FIG. 24 is a flow chart showing a processing operation performed for obtaining backup. Next, explanation will be given on this.

(1) Firstly, backup software on the host 200 requests the server 100 to obtain a snapshot with specifying a virtualized volume to be backed up (step 2101).

(2) Upon reception of the request, the server 100 performs the snapshot formation and division with respect to the storage device 300 and obtains a snapshot, i.e., a frozen image in the destination volume (steps 2102 and 2103).

(3) Next, the server 100 reports to the backup software of the host 200 that a snapshot is complete and notifies the aforementioned destination virtualized volume (step 2104).

(4) Upon reception of the report and notification, the backup software on the host 200 reads out data from the destination virtualized volume and writes the data into a backup storage device 500 to obtain a backup, thereby terminating the processing (step 2105).

The physical volume in the aforementioned processing may be a storage region of a magnetic disc device or a logical storage region such as provided by a magnetic disc device having a control device of RAID configuration.

In the aforementioned embodiment of the present invention, by performing the aforementioned processing, it is possible to perform management and control of the processing in the controller 310 of the storage device 300 according to a virtualized storage region and especially, it is possible to perform snapshot formation, management, and control in a virtualized region independently.

Furthermore, in the aforementioned embodiment of the present invention, an instruction about processing management and control in the controller 310 of the storage device 300 is performed according to a virtualized storage region, which simplifies management and control as well as reduces processing overhead.

In the aforementioned embodiment of the present invention, the storage device 300 has a snapshot formation function on volume basis of the physical volume 400 and explanation has been given on that the snapshot formation of a virtualized volume is realized by that the storage device 300 creates a snapshot of the physical volume 400 constituting the virtualized volume. However, even when the storage device 300 has a snapshot formation function not on a physical volume basis but a partial region basis of the physical volume 400, an instruction about processing management and control in the controller 310 of the storage device 300 is performed according to a virtualized storage region. Thus, it is possible to simplify management and control and reduce the processing overhead.

FIG. 25 shows another example of the in-device physical volume information 311 and FIG. 26 shows another example of the in-device snapshot information 313. For example, the controller 310 has the in-device physical volume information 311 as shown in FIG. 25 and the in-device snapshot information 313 as shown in FIG. 26, and has a pair formation, division, combination functions and processes for a pair of a source physical volume range region and a destination physical volume range region and has a function and process for selecting destination region. In this case also, by the aforementioned processes, the same effects can be obtained.

In the aforementioned embodiment of the present invention, the storage device 300 has the controller 310. However, the present invention can also be applied to a case when the controller 310 and the storage device 300 are separate devices.

FIG. 27 is a block diagram showing a computer system configuration according to another (second) embodiment of the present invention. In FIG. 27, a reference symbol 900 denotes back end connection means and the other reference symbols are identical to those in FIG. 1.

In the embodiment of the present invention shown in FIG. 27, the controller 310 is provided as a separate device from the storage device 300 and connected to the network 700. The controller 310 and the storage device 300 are connected to each other by the back end connection 900. In this configuration also, it is possible to perform the processes same as those in the aforementioned (first) embodiment. The connection means 900 may be, for example, FC, IP, Infini Band, and the like.

The management terminal 800 references the aforementioned various information items held by the server 100 via the network 700 or the SAN 600 and can display them for a user. Moreover, according to a request from the user, the management terminal can set various information items via the network 700 or the SAN 600 such as formation/setting/deletion of a virtualized volume, making correspondence between the virtualized volume and the physical volume 400, formation/setting/deletion of a virtualized volume pair, and the like.

As has been described above, according to the present invention, in an information processing system which virtualizes a storage region, it is possible to perform management and control of processing in a storage system according to a virtualized storage region. Especially, in the storage device system, it is possible to perform snapshot formation, management, and control according to a virtualized storage region independently. Moreover, according to the present invention, instructions of processing management and control in the storage device system can be performed according to a virtualized storage region.

It should be further understood by those skilled in the art that the foregoing description has been made on embodiments of the invention and that various changes and modifications may be made in the invention without departing from the spirit of the invention and scope of the appended claims.

What is claimed is:

1. A data replication method for a computer system which includes at least one storage device including plural physical volumes and a controller, and an apparatus including first correspondence information between a virtualized volume and a physical volume included in the virtualized volume, said data replication method comprising steps of:

in said apparatus, receiving a data replication request designating a virtualized volume from a computer;

in said apparatus, identifying at least one storage device including a physical volume corresponding to said virtualized volume by referring to the first correspondence information;

in said apparatus, sending to the specified storage device a replication request designating said virtualized volume;

in a storage device, receiving a replication request designating said virtualized volume from said apparatus;

in said storage device, identifying at least one source physical volume corresponding to said virtualized volume, by referring to second correspondence information between a virtualized volume and a physical volume included in the virtualized volume, said second correspondence information is included in said storage device;

in said storage device, identifying at least one target physical volume corresponding to said at least one source physical volume; and in said storage device, copying data stored in said at least one source physical volume to said at least one target physical volume.

2. A data replication method according to claim 1, wherein said second correspondence information includes correspondence information between a physical volume included in said storage device and a virtualized volume including said physical volume.

3. A data replication method according to claim 2, further comprising steps of:

in said apparatus, selecting information designating correspondence between a physical volume included in said storage device and a virtualized volume including said physical volume by referring to said first correspondence information;

in said apparatus, sending the selected information from said apparatus to said storage device; and in said storage device, setting said second correspondence information by using the received information.

4. A data replication method according to claim 1, wherein said virtualized volume includes plural physical storage devices each of which is included in a different storage device, and said apparatus sends said replication request designating said virtualized volume to plural storage devices, each of which includes one of said plural physical storage devices.

5. A data replication method for a computer system which includes at least one storage device having plural physical volumes and a controller, and an apparatus having first correspondence information among a group, a virtualized volume included in the group, and a physical volume included in the virtualized volume, said data replication method comprising steps of:

in said apparatus, receiving data replication request designating a group including plural pairs of a source virtualized volume and a target virtualized volume;

in said apparatus, identifying at least one storage device including a source physical volume corresponding to a source virtualized volume included in said group by referring to said first correspondence information;

in said apparatus, sending said at least one storage device a replication request designating said group;

in said at least one storage device, receiving a replication request designating said group from said apparatus;

in said at least one storage device, identifying a source physical volume corresponding to a source virtualized volume included in said group by referring to second correspondence information among a group, a virtualized volume included in the group, and a physical volume included in the virtualized volume, said second correspondence information is included in said at least one storage device;

in said at least one storage device, identifying a target physical volume corresponding to said source physical volume; and in said at least one storage device, copying data stored in said source physical volume to said target physical volume.

6. A data replication method according to claim 5, wherein said second correspondence information includes correspondence information among a physical volume included in said at least one storage device, a virtualized volume including said physical volume, and a group including said virtualized volume.

7. A computer system comprising:

at least one storage device including plural physical volumes and a controller; and an apparatus including first correspondence information between a virtualized volume and a physical volume included in the virtualized volume;

wherein said apparatus receives a data replication request designating a virtualized volume from a computer, identifies at least one storage device including a physical volume corresponding to said virtualized volume by referring to the first correspondence information, and sends to the specified storage device a replication request designating said virtualized volume, and wherein a storage device receives a replication request designating said virtualized volume from said apparatus, identifies at least one source physical volume corresponding to said virtualized volume by referring to second correspondence information between a virtualized volume and a physical volume included in the virtualized volume, said second correspondence information is included in said storage device, identifies at least one target physical volume corresponding to said at least one source physical volume, and copies data stored in said at least one source physical volume to said at least one target physical volume.

8. A computer system according to claim 7, wherein said second correspondence information includes correspondence information between a physical volume included in said storage device and a virtualized volume including said physical volume.

9. A computer system according to claim 8, wherein said apparatus selects information designating correspondence between a physical volume included in said storage device and a virtualized volume including said physical volume by referring to said first correspondence information, and sends the selected information from said apparatus to said storage device, and wherein said storage device sets said second correspondence information by using the received information.

10. A computer system according to claim 7, wherein said virtualized volume includes plural physical storage devices each of which is included in a different storage device, and said apparatus sends said replication request designating said virtualized volume to plural storage devices, each of which includes one of said plural physical storage devices.

11. A computer system comprising:

at least one storage device having plural physical volumes and a controller; and an apparatus having first correspondence information among a group, a virtualized volume included in the group, and a physical volume included in the virtualized volume;

wherein said apparatus receives a data replication request designating a group including plural pairs of a source virtualized volume and a target virtualized volume, identifies at least one storage device including a source physical volume corresponding to a source virtualized volume included in said group by referring to said first correspondence information, and sends said at least one storage device a replication request designating said group; and wherein said at least one storage device receives a replication request designating said group from said apparatus, identifies a source physical volume corresponding to a source virtualized volume included in said group by referring to second correspondence information among a group, a virtualized volume included in the group, and a physical volume included in the virtualized volume, said second correspondence information is included in said at least one storage device, identifies a target physical volume corresponding to said source physical volume, and copies data stored in said source physical volume to said target physical volume.

12. A computer system according to claim 11, wherein said second correspondence information includes correspondence information among a physical volume included in said at least one storage device, a virtualized volume including said physical volume, and a group including said virtualized volume.

13. A storage apparatus for use in a computer system which includes an apparatus including first correspondence information between a virtualized volume and a physical volume included in the virtualized volume and at least one storage apparatus, said storage apparatus comprising:

plural physical volumes; and a controller;

wherein said apparatus receives a data replication request designating a virtualized volume from a computer, identifies at least one storage device including a physical volume corresponding to said virtualized volume by referring to the first correspondence information, and sends to the specified storage device a replication request designating said virtualized volume; and wherein said storage apparatus receives a replication request designating said virtualized volume from said apparatus, identifies at least one source physical volume corresponding to said virtualized volume by referring to second correspondence information between a virtualized volume and a physical volume included in the virtualized volume, said second correspondence information is included in said storage apparatus, identifies at least one target physical volume corresponding to said at least one source physical volume, and copies data stored in said at least one source physical volume to said at least one target physical volume.

14. A storage apparatus according to claim 13, wherein said second correspondence information includes correspondence information between a physical volume included in said storage apparatus and a virtualized volume including said physical volume.

15. A storage apparatus according to claim 14, wherein said apparatus selects information designating correspondence between a physical volume included in said storage device and a virtualized volume including said physical volume by referring to said first correspondence information, and sends the selected information from said apparatus to said storage device, and wherein said storage apparatus sets said second correspondence information by using the received information.

* * * * *